United States Patent [19]

Dimroth et al.

[11] 3,953,420

[45] Apr. 27, 1976

[54] AZO PIGMENTS DERIVED FROM 2-HYDROXY-3-CARBOXYNAPHTHALENE CONTAINING A SUBSTITUTED OR UNSUBSTITUTED PHTHALIMIDE

[75] Inventors: Peter Dimroth, Lugwigshafen; Frank Dost, Mannhein; Rolf Urtel, Ludwigshafen, all of Germany

[73] Assignee: Badische Anilin- & Soda-Fabrik Aktiengesellschaft, Ludwigshafen, (Rhine), Germany

[22] Filed: Jan. 26, 1973

[21] Appl. No.: 326,680

[30] Foreign Application Priority Data

Jan. 29, 1972 Germany............................ 2204253
Aug. 19, 1972 Germany............................ 2240927

[52] U.S. Cl.................................. 260/152; 106/23; 106/288 Q; 106/308 M; 106/308 N; 260/42.21; 260/165; 260/326 A; 260/326 N; 260/326 S; 428/518

[51] Int. Cl.² ..................... C09B 29/36; D06P 1/08;

D06P 5/08

[58] Field of Search............................ 260/152, 165

[56] References Cited

UNITED STATES PATENTS 3,402,166   9/1968   Heckl et al. ........................ 260/152
3,644,405   2/1972   Horstmann et al. ................ 260/156

FOREIGN PATENTS OR APPLICATIONS 44-18588   8/1969   Japan................................. 260/152

*Primary Examiner*—Floyd D. Higel
*Attorney, Agent, or Firm*—Johnston, Keil, Thompson & Shurtleff

[57] ABSTRACT

Azo pigments derived from 2-hydroxy-3-carboxynaphthalene and containing a substituted or unsubstituted phthalimide radical. The majority give red colorations and due to their excellent fastness properties are particularly valuable for use in surface coatings and resins.

3 Claims, No Drawings

AZO PIGMENTS DERIVED FROM 2-HYDROXY-3-CARBOXYNAPHTHALENE CONTAINING A SUBSTITUTED OR UNSUBSTITUTED PHTHALIMIDE

This invention relates to new azo dyes of the general formula I:

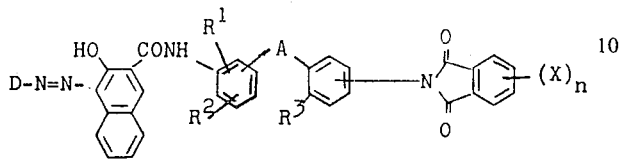

I where
A is —NHCO— or —CONH—,
D is the radical of a diazo component,
$R^1$ is hydrogen, chlorine, bromine, alkyl, alkoxy, alkylsulfonyl or cyano,
$R^2$ is hydrogen, chlorine, bromine, alkyl or alkoxy,
$R^3$ is hydrogen, chlorine, alkyl or alkoxy,
X is chlorine or bromine, and
n is one of the integers 0, 1, 2, 3 and 4.

Examples of diazo components are aniline derivatives, aminophthalimides, aminoanthraquinones, and particularly halo- and nitroanilines, 3- and 4-amino-N-arylphthalimides and unsubstituted or chlorine-substituted 1- or 2-aminoanthraquinone.

Specific diazo components include
2,4-dinitro-6-bromoaniline
3-nitro-4-methylaniline
2-nitro-4-methylaniline
2-nitro-4-methoxyaniline
2-nitro-5-methoxyaniline
2-nitro-4-chloroaniline
2-nitro-5-chloroaniline
2-methoxy-5-chloroaniline
2-methoxy-4,5-dichloroaniline
2-chloro-4-nitroaniline
2-amino-5-nitrobenzonitrile
2-methyl-4-nitroaniline
2-methyl-5-nitroaniline
2-nitro-4-methylaniline
2-methoxy-4-nitroaniline
3-amino-4-methoxybenzonitrile
2-nitro-4-chloraniline
2-chloro-5-nitroaniline
3-nitro-4-chloroaniline
2-amino-5-chlorobenzonitrile
2-methylsulfonyl-4-chloroaniline
2-aminobenzonitrile
2-amino-5-nitrobenzonitrile
2-amino-5-chlorobenzonitrile
2-amino-5-chlorobenzotrifluoride
methyl anthranilate
methyl 3,5-dichloroanthranilate
dimethylaminoterephthalate
3-amino-4-methoxybenzanilide
2,4-dichloroaniline-5-carbonamide
2,4-dichloroaniline-5-carbanilide
1-aminoanthraquinone
3-chloro-1-aminoanthraquinone
6,7-dichloro-1-aminoanthraquinone
2-aminoanthraquinone
3-chloro-2-aminoanthraquinone
3-aminophthalimide
3-amino-N-phenylphthalimide
o-, m- und p-chloroaniline
2,4-dichloroaniline
2,5-dichloroaniline
2,4,5-trichloroaniline
2-methyl-3-chloroaniline
4-methyl-3-chloroaniline
2,5-dichloro-4-methylaniline
2,4-dichloro-5-methylaniline
o-, m- und p-nitroaniline
2,4-dinitroaniline
N-(o-chloro)-phenyl-3-aminophthalimide
N-(p-chloro)-phenyl-3-aminophthalimide
4-aminophthalimide
4-amino-N-phenylphthalimide
6-aminophthalide
methyl 4-chloro-3-aminobenzoate
4-chloro-3-aminobenzamide
4-chloro-3-aminobenzenesulfonamide
4-chloro-3-aminobenzenesulfonanilide
4-chloro-3-aminobenzenesulfonic acid dichloroanilide and
4-aminobenzanilide.

Alkyl and alkoxy radicals R' and $R^2$ are particularly methyl, ethyl, methoxy and ethoxy, and alkylsulfonyl radicals $R^1$ are for example methyl- and ethylsulfonyl.

The new dyes may be prepared for example by condensing a. an acyl halide of the formula II:

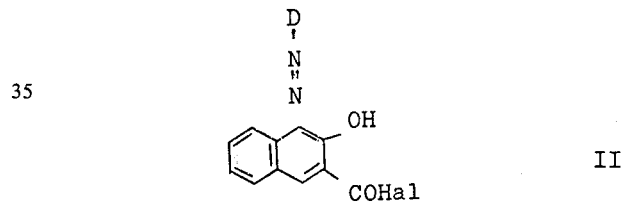

II where Hal is chlorine or bromine, with an amine of the formula III:

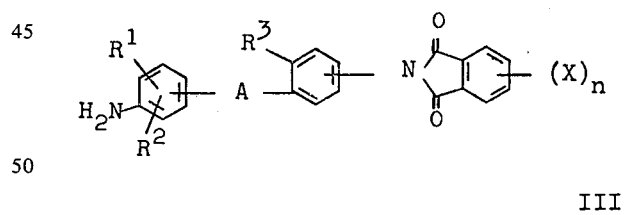

III or by coupling b. the diazo compound of an amine of the formula IV:

D—NH₂  IV with a coupling component of the formula V:

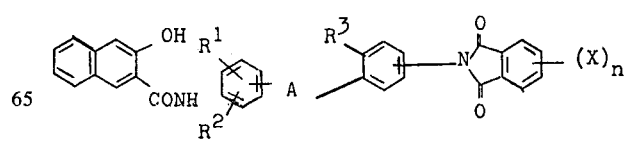

V

The azo dye carboxylic acids on which the azo dye acid halides II are based are prepared in conventional manner by coupling the diazonium salts of amines of formula IV with 2-hydroxynaphthoic acid-(3).

They may be converted with the acid halides in conventional manner using halogenating agents such as $POCl_3$, $POBr_3$, $PBr_3$, $SOCl_2$, $SOBr_2$ or $COCl_2$, preferably in an inert solvent such as nitrobenzene, a chlorinated benzene, xylene or N-methylpyrrolidone which may contain a catalytic amount of dimethylformamide or pyridine.

Amines of formula III (where $R^3$ and X have the meanings given above) are for example:

n = 4 or 0

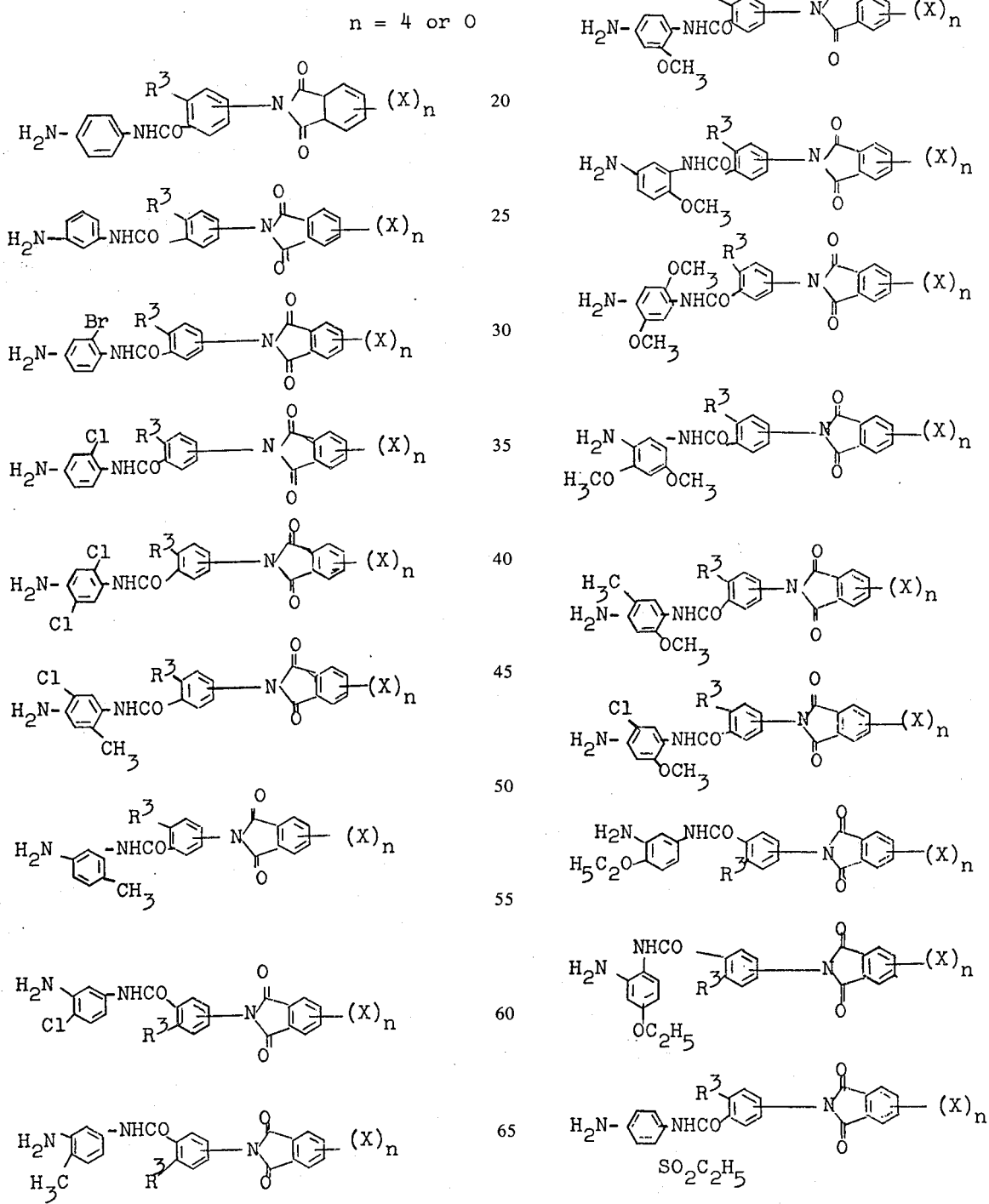

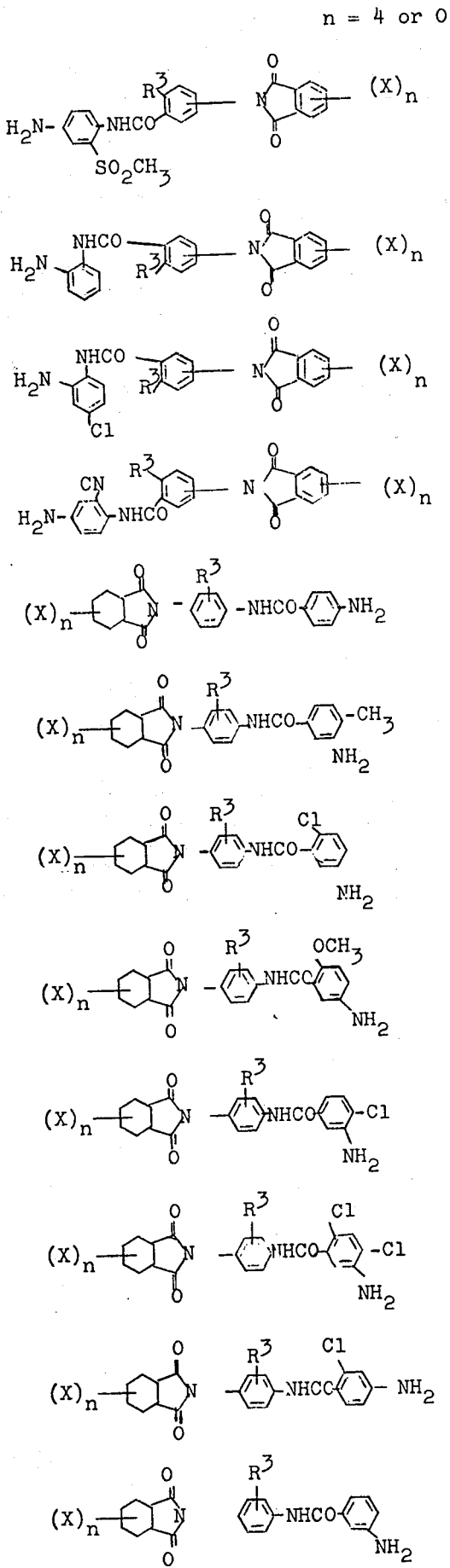

n = 4 or 0

The condensation of the acid halides of formula II with the amines of formula III is preferably effected by heating in an organic solvent such as o-dichlorobenzene, nitrobenzene, methyl benzoate, xylene, dimethylformamide or N-methylpyrrolidone, an acid-binding agent such as sodium acetate or pyridine or a catalytic amount of a compound which accelerates the acylation reaction at temperatures above 100°C such as collidine or N-methylpyrrolidone being added if desired.

Difficultly soluble amines (III) may be dissolved in just sufficient N-methylpyrrolidone or dimethylformamide and then reacted as a solution with the acid chloride (II), for example in o-dichlorobenzene.

Coupling components of formula V may be prepared for example by condensation of 2-hydroxynaphthalene-3-carboxylic acid with an amine of formula III in the presence of a chlorinating agent such as $PCl_3$, or by condensation of the acyl chloride with an amine of formula III.

The compounds of formula V are preferably coupled with the diazo compounds of amines of formula IV by adding an aqueous-alkaline solution of the coupling component, or a very finely divided suspension of the coupling component in water which may contain an organic solvent, to the acid diazonium salt solution. The pH is conveniently from 4 to 7 and is advantageously adjusted by adding a buffer such as sodium acetate. The addition of wetting or dispersing agents such as aralkyl sulfonate may promote a smooth course of the reaction.

The pigments of the invention are obtained in a state of very high purity, though not always in an optimum physical form for all applications. They can then be modified to suit the particular requirements by size reduction, salt grinding or recrystallization. The new pigments can be used for mass coloration, for example of viscose, for producing colored print pastes for letterpress or litho, for coloring surface coatings such as those based on nitrocellulose, acrylate resins, melamine resins and alkyd resins, for coloring phenolic or amino resins, thermoplastics such as polystyrene, polyolefins or PVC, rubber, silicone resins, laminated papers or sheets, or for textile printing.

The new pigments are particularly suitable for coloring polyvinyl chloride, polyethylene or polypropylene and in surface coatings and high-quality printing inks.

Particular industrial importance attaches to dyes of the formula Ia:

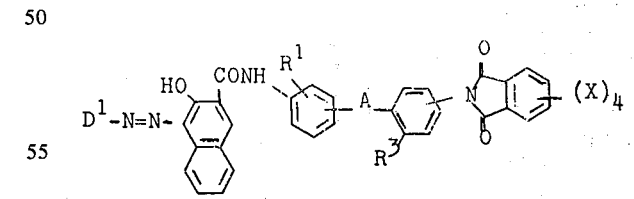

Ia where
  $D^1$ is the radical of unsubstituted or chlorine-substituted 1- or 2-aminoanthraquinone, 3- or 4-amino-N-phenylphthalimide, or aniline substituted by halogen, methyl, methoxy, nitro, cyano, methylsulfonyl or carbomethoxy, and
  A, $R^1$, $R^3$ and X have the meanings given above.
  A is preferably —NHCO—.

Examples of particularly valuable diazo components are:
1. 1-aminoanthraquinone
2. 3-chloro-1-aminoanthraquinone
3. 3-amino-N-phenylphthalimide
4. 2,4,5-trichloroaniline
5. 2,5-dichloroaniline
6. 2-chloro-4-nitroaniline
7. 2-amino-5-nitrobenzonitrile
8. 2-methoxy-4-nitroaniline
9. 3-amino-4-methoxybenzonitrile
10. 2-amino-5-chlorobenzonitrile
11. 3-amino-4-methylbenzonitrile
12. 3-amino-4-chlorobenzonitrile The invention is further illustrated by the following Examples in which parts and percentages are by weight unless specified otherwise. Temperatures are given in °C.

EXAMPLE 1

211 parts of the dye obtained by coupling diazotized 1-aminoanthraquinone with 2-hydroxynaphthoic acid-(3) is heated while stirring for 4 hours at 100° to 110°; together with 1300 parts of nitrobenzene, 90 parts of thionyl chloride and 5 parts of dimethylformamide. Excess thionyl chloride is removed under subatmospheric pressure and the uniformly crystalline azo dye acyl chloride obtained on cooling is filtered off. It is washed with 300 parts of nitrobenzene and then with 1000 parts of cyclohexane and dried at 80° under subatmospheric pressure. 195 parts of a red crystal powder is obtained.

Analysis: calcd: Cl 8.05%. found: Cl 8.5%.

13.2 parts of the acid chloride thus obtained is stirred in 200 parts of trichlorobenzene and mixed at 60° with 12.6 parts of the amine of the formula

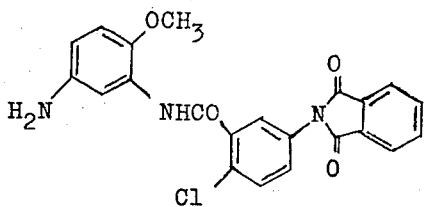

which has been dissolved in 100 parts of trichlorobenzene and 10 parts of N-methylpyrrolidone. The whole is stirred for 1 hour at 80° and for 4 hours at 120°, allowed to cool to 80° and filtered. The residue is washed with hot trichlorobenzene and nitrobenzene and then with cold methanol until the filtrate running away is clear. By drying at 80° under subatmospheric pressure 17 parts of a red powder is obtained which is substantially insoluble in all common solvents. PVC film and surface coatings are colored red shades having excellent fastness to light, migration and overcoating. The pigment has the formula

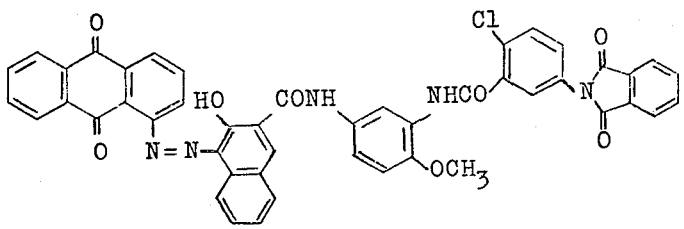

Analysis: calcd: Cl 4.3%. found: Cl 4.5%.

EXAMPLE 2

140 parts of the dye obtained by coupling diazotized 3-amino-N-phenylphthalimide with 2-hydroxynaphthoic acid-(3) is heated in the course of an hour to 110° together with 400 parts of nitrobenzene, 60 parts of thionyl chloride and 5 parts of dimethylformamide and kept at this temperature for 3 hours. Excess thionyl chloride is removed under subatmospheric pressure and the uniformly crystalline azo dye acyl chloride which precipitates on cooling is filtered off, washed with 200 parts of nitrobenzene and then with 1000 parts of cyclohexane, and dried at 80° under subatmospheric pressure to yield 130 parts of a red powder.

Analysis: calcd: Cl 7.8%. found: Cl 7.6%.

9.6 parts of the acid chloride thus obtained is stirred in 800 parts of o-dichlorobenzene and mixed at 80° with 7.8 parts of the amine of the formula

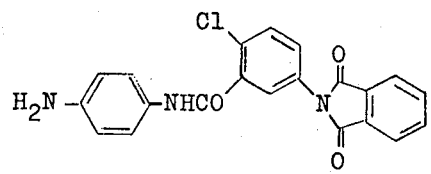

which has been dissolved in 80 parts of dimethylformamide. The whole is heated for 5 to 6 hours at 140° to 145°, allowed to cool to 80° and filtered. The pigment is washed with hot o-dichlorobenzene and then with methanol until the filtrate running away is clear. By drying at 80° under reduced pressure 13 parts of a red powder is obtained which is substantially insoluble in all common solvents. PVC film and surface coatings are colored red shades having excellent fastness to light, migration and overcoating. The pigment has the formula

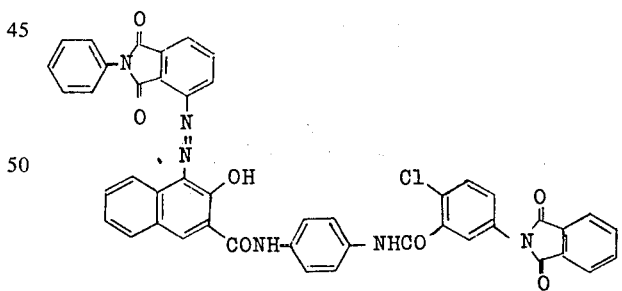

Analysis: calcd: Cl 4.4%. found: Cl 4.7%.

EXAMPLE 3

237 parts of the dye obtained by coupling diazotized 2,4,5-trichloroaniline with 2-hydroxynaphthoic acid-(3) is heated in the course of two hours to 110° together with 500 parts of nitrobenzene, 142 parts of thionyl chloride and 2 parts of dimethylformamide and kept at this temperature for 2 hours. Excess thionyl chloride is removed under subatmospheric pressure and the uniformly crystalline azo dye acyl chloride which precipitates on cooling is filtered off, washed with hot nitrobenzene and then with cyclohexane, and dried at 80° under subatmospheric pressure to yield 195 parts of deep red crystals.

Analysis: calcd: Cl 34.3%. found: Cl 34.4%.

12.45 parts of the acid chloride thus obtained is stirred in 800 parts of o-dichlorobenzene and mixed at 80° with 11.75 parts of the amine of the formula

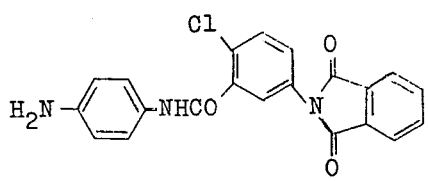

which has been dissolved hot in 70 parts of dimethylformamide. The whole is heated for 5 hours at 145°, allowed to cool to 80° and filtered. The residue is washed with hot o-dichlorobenzene and then with methanol until the filtrate running away is clear. By drying at 80° under reduced pressure 18.6 parts of an orange powder is obtained which is substantially insoluble in all common solvents. PVC film and surface coatings are colored orange shades having good fastness to light, migration and overcoating. The pigment has the formula

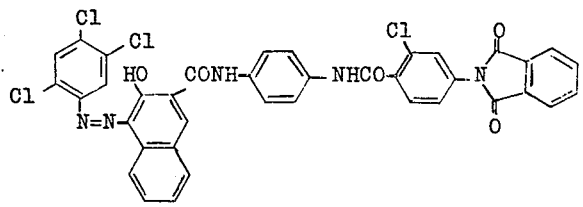

Analysis: calcd: Cl 18.5%. found: Cl 18.8%.

EXAMPLE 4

350 parts of the dye obtained by coupling 2,5-dichloroaniline with 2-hydroxynaphthoic acid-(3) is heated slowly (in the course of two hours) to 110° together with 1500 parts of nitrobenzene, 236 parts of thionyl chloride and 2 to 5 parts of dimethylformamide and kept at this temperature for 2 hours. Excess thionyl chloride is removed under subatmospheric pressure and the crystalline azo dye acyl chloride which precipitates on cooling is filtered off, washed with a small amount of benzene and then with cyclohexane, and dried at 80° under subatmospheric pressure to yield 295 parts of a red crystal powder.

Analysis: calcd: Cl 28.35%. found: Cl 27.9%.

11.4 parts of the acid chloride thus obtained is stirred in 200 parts of nitrobenzene and mixed at 80° with 11.7 parts of the amine of the formula

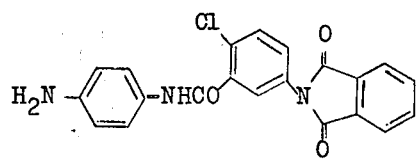

which has been dissolved in 50 parts of nitrobenzene and 20 parts of N-methylpyrrolidone. The whole is heated for 5 hours at 130°, allowed to cool to 80° and filtered. The pigment is washed with hot nitrobenzene and then with cold methanol until the filtrate running away is clear. By drying at 80° under reduced pressure 20 parts of a red pigment is obtained which has very good fastness to solvents. PVC film and surface coatings are colored red shades having good fastness to light, migration and overcoating. The pigment has the formula

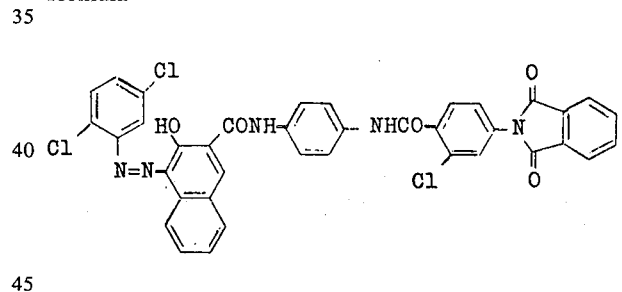

Analysis: calcd: Cl 14.5%. found: Cl 15.0%.

By following the method described in Examples 1 to 4 further pigments may be obtained from the diazo components $D^1$ given in the following Table by reaction with 2-hydroxynaphthoic acid-(3) followed by condensation with the amines listed therein. The figures given in the column headed "Diazo component $D^1$" refers to the list of amines on pages 10 and 11. The last column gives the shade obtained by using the pigment for coloring surface coatings.

| Ex. | Amine (formula III) | Diazo component $D^1$ | Shade |
|---|---|---|---|
| 5 | H₂N-⌬-NHCO-⌬-N(phthalimide) | 1 | bluish red |
| 6 | " | 2 | red |
| 7 | " | 3 | red |
| 8 | " | 4 | red |
| 9 | " | 5 | orange |
| 10 | " | 6 | orange |

-continued

| Ex. | Amine (formula III) | Diazo component D¹ | Shade |
|---|---|---|---|
| 11 | '' | 7 | red |
| 12 | '' | 8 | yellowish red |
| 13 | H₂N—⟨⟩—NHCO—⟨⟩—N(phthalimide) | 9 | yellowish red |
| 14 | '' | 10 | yellowish red |
| 15 | H₂N—⟨⟩—NHCO—⟨⟩—N(phthalimide) | 1 | bluish red |
| 16 | '' | 2 | red |
| 17 | '' | 3 | red |
| 18 | '' | 4 | reddish brown |
| 19 | '' | 5 | bluish red |
| 20 | '' | 6 | red |
| 21 | '' | 7 | red |
| 22 | H₂N—⟨⟩—NHCO—⟨Cl⟩—N(phthalimide) | 1 | bluish red |
| 23 | '' | 2 | red |
| 24 | '' | 3 | red |
| 25 | '' | 4 | yellowish red |
| 26 | '' | 5 | yellowish red |
| 27 | '' | 6 | yellowish red |
| 28 | '' | 7 | yellowish red |
| 29 | '' | 8 | yellowish red |
| 30 | H₂N—⟨⟩—NHCO—⟨Cl⟩—N(phthalimide) | 1 | reddish violet |
| 31 | '' | 2 | red |
| 32 | '' | 4 | red |
| 33 | '' | 5 | red |
| 34 | '' | 6 | red |
| 35 | '' | 7 | red |
| 36 | '' | 8 | reddish orange |
| 37 | H₂N—⟨⟩—NHCO—⟨⟩—N(tetrachlorophthalimide) | 1 | bluish red |
| 38 | '' | 2 | red |
| 39 | '' | 3 | red |
| 40 | '' | 4 | yellowish red |
| 41 | '' | 5 | yellowish red |
| 42 | '' | 6 | yellowish red |
| 43 | '' | 7 | orange |
| 44 | '' | 8 | orange |
| 45 | H₂N—⟨⟩—NHCO—⟨⟩—N(tetrachlorophthalimide) | 1 | bluish red |

-continued

| Ex. | Amine (formula III) | Diazo component D¹ | Shade |
|---|---|---|---|
| 46 | " | 2 | bluish red |
| 47 | " | 4 | bluish red |
| 48 | " | 5 | bluish red |
| 49 | " | 6 | red |
| 50 | H₂N–⌬–NHCO–⌬–N(tetrachlorophthalimide) | 7 | red |
| 51 | " | 8 | red |
| 52 | H₂N–⌬–NHCO–⌬(Cl)–N(tetrachlorophthalimide) | 1 | red |
| 53 | " | 2 | red |
| 54 | " | 4 | red |
| 55 | " | 5 | red |
| 56 | " | 6 | red |
| 57 | " | 7 | red |
| 58 | " | 8 | yellowish red |
| 59 | H₂N–⌬–NHCO–⌬(Cl)–N(tetrachlorophthalimide) | 1 | reddish violet |
| 60 | " | 2 | red |
| 61 | " | 3 | red |
| 62 | " | 4 | yellowish red |
| 63 | " | 5 | yellowish red |
| 64 | " | 6 | red |
| 65 | " | 7 | reddish orange |
| 66 | H₂N–⌬–HNCO–⌬–N(phthalimide) | 1 | bluish red |
| 67 | " | 2 | yellowish red |
| 68 | H₂N–⌬–NHCO–⌬–N(phthalimide) | 4 | yellowish red |
| 69 | " | 5 | yellowish red |
| 70 | " | 6 | yellowish red |
| 71 | " | 7 | yellowish red |
| 72 | " | 8 | yellowish red |
| 73 | H₂N–⌬–NHCO–⌬(Cl)–N(phthalimide) | 1 | bluish red |

-continued

| Ex. | Amine (formula III) | Diazo component D¹ | Shade |
|---|---|---|---|
| 74 | '' | 2 | yellowish orange |
| 75 | '' | 3 | yellowish orange |
| 76 | '' | 4 | yellowish orange |
| 77 | '' | 5 | yellowish orange |
| 78 | '' | 6 | yellowish orange |
| 79 | '' | 7 | yellowish orange |
| 80 | '' | 8 | yellowish orange |
| 81 | H₂N—⟨⟩—NHCO—⟨⟩(Cl)—N(phthalimide) | 1 | bluish red |
| 82 | '' | 2 | bluish red |
| 83 | '' | 3 | red |
| 84 | '' | 4 | yellowish red |
| 85 | '' | 5 | red |
| 86 | H₂N—⟨⟩—NHCO—⟨⟩(Cl)—N(phthalimide) | 6 | red |
| 87 | '' | 7 | red |
| 88 | '' | 8 | red |
| 89 | H₂N—⟨⟩—NHCO—⟨⟩—N(tetrachlorophthalimide) | 1 | bluish red |
| 90 | '' | 2 | orange |
| 91 | '' | 3 | orange |
| 92 | '' | 4 | orange |
| 93 | '' | 5 | orange |
| 94 | '' | 6 | orange |
| 95 | '' | 7 | orange |
| 96 | '' | 8 | orange |
| 97 | H₂N—⟨⟩—NHCO—⟨⟩—N(dichloro-dimethyl-phthalimide) | 1 | red |
| 98 | '' | 4 | red |
| 99 | '' | 7 | red |
| 100 | '' | 6 | red |
| 101 | '' | 5 | red |
| 102 | '' | 8 | reddish orange |
| 103 | H₂N—⟨⟩—NHCO—⟨⟩(Cl)—N(tetrachlorophthalimide) | 1 | bluish red |
| 104 | '' | 2 | bluish red |
| 105 | '' | 3 | red |
| 106 | '' | 4 | orange |

-continued

| Ex. | Amine (formula III) | Diazo component D¹ | Shade |
|---|---|---|---|
| 107 | H₂N–⟨⟩–NHCO–⟨⟩(Cl)–N(phthalimide-Cl₄) | 5 | orange |
| 108 | ″ | 6 | orange |
| 109 | ″ | 7 | orange |
| 110 | ″ | 8 | orange |
| 111 | H₂N–⟨⟩–NHCO–⟨⟩(Cl)–N(phthalimide-Cl₄) (isomer) | 1 | bluish red |
| 112 | ″ | 2 | bluish red |
| 113 | ″ | 3 | red |
| 114 | ″ | 4 | red |
| 115 | ″ | 5 | red |
| 116 | ″ | 6 | yellowish red |
| 117 | ″ | 7 | red |
| 118 | ″ | 8 | yellowish red |
| 119 | H₂N–⟨⟩(Br)–NHCO–⟨⟩–N(phthalimide) | 1 | bluish red |
| 120 | ″ | 4 | bluish red |
| 121 | ″ | 5 | red |
| 122 | ″ | 7 | red |
| 123 | H₂N–⟨⟩(Br)–NHCO–⟨⟩–N(phthalimide) (isomer) | 1 | reddish brown |
| 124 | ″ | 4 | bluish red |
| 125 | ″ | 5 | reddish brown |
| 126 | H₂N–⟨⟩(Br)–NHCO–⟨⟩(Cl)–N(phthalimide) | 1 | red |
| 127 | ″ | 4 | orange |
| 128 | ″ | 5 | orange |
| 129 | ″ | 7 | orange |
| 130 | H₂N–⟨⟩(Br)–NHCO–⟨⟩(Cl)–N(phthalimide) (isomer) | 1 | violet |
| 131 | ″ | 2 | bluish red |
| 132 | ″ | 4 | red |
| 133 | ″ | 5 | red |
| 134 | ″ | 7 | red |
| 135 | H₂N–⟨⟩(Br)–NHCO–⟨⟩–N(phthalimide-Cl₄) | 1 | bluish red |
| 136 | ″ | 4 | red |
| 137 | ″ | 5 | red |

-continued

| Ex. | Amine (formula III) | Diazo component D¹ | Shade |
|---|---|---|---|
| 138 | H₂N—C₆H₃(Br)—NHCO—C₆H₄—N(tetrachlorophthalimide) | 1 | reddish brown |
| 139 | " | 4 | red |
| 140 | " | 5 | reddish brown |
| 141 | H₂N—C₆H₃(Br)—NHCO—C₆H₃(Cl)—N(tetrachlorophthalimide) | 1 | red |
| 142 | " | 4 | orange |
| 143 | " | 5 | orange |
| 144 | " | 7 | orange |
| 145 | H₂N—C₆H₃(Br)—NHCO—C₆H₃(Cl)—N(tetrachlorophthalimide) | 1 | violet |
| 146 | " | 4 | yellowish red |
| 147 | " | 5 | yellowish red |
| 148 | " | 7 | yellowish red |
| 149 | H₂N—C₆H₃(Cl)—NHCO—C₆H₄—N(phthalimide) | 1 | bluish red |
| 150 | " | 2 | red |
| 151 | " | 4 | red |
| 152 | " | 5 | bluish red |
| 153 | " | 6 | red |
| 154 | " | 7 | red |
| 155 | " | 8 | red |
| 156 | H₂N—C₆H₃(Cl)—NHCO—C₆H₄—N(phthalimide) | 1 | reddish brown |
| 157 | " | 2 | red |
| 158 | " | 4 | orange |
| 159 | " | 5 | reddish brown |
| 160 | H₂N—C₆H₃(Cl)—NHCO—C₆H₃(Cl)—N(phthalimide) | 1 | bluish red |
| 161 | " | 2 | red |
| 162 | " | 4 | yellowish red |
| 163 | " | 5 | red |
| 164 | " | 6 | yellowish red |
| 165 | " | 7 | yellowish red |
| 166 | H₂N—C₆H₃(Cl)—NHCO—C₆H₃(Cl)—N(phthalimide) | 1 | violet |

-continued

| Ex. | Amine (formula III) | Diazo component D¹ | Shade |
|---|---|---|---|
| 167 | " | 2 | red |
| 168 | " | 4 | orange |
| 169 | " | 5 | red |
| 170 | " | 6 | red |
| 171 | " | 7 | red |
| 172 | 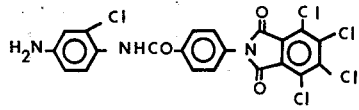 | 1 | bluish red |
| 173 | " | 2 | red |
| 174 | " | 4 | orange |
| 175 | " | 5 | orange |
| 176 | " | 6 | orange |
| 177 | " | 7 | orange |
| 178 | 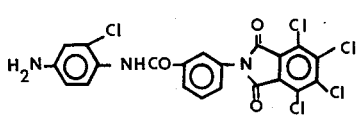 | 1 | brownish red |
| 179 | " | 4 | brownish red |
| 180 | " | 5 | brownish red |
| 181 | 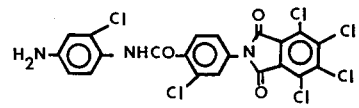 | 1 | bluish red |
| 182 | " | 4 | orange |
| 183 | " | 5 | orange |
| 184 | " | 7 | orange |
| 185 | 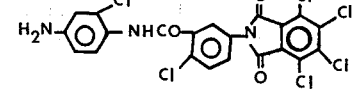 | 1 | violet |
| 186 | " | 4 | orange |
| 187 | " | 5 | red |
| 188 | " | 6 | red |
| 189 | " | 7 | red |
| 190 | " | 8 | red |
| 191 | 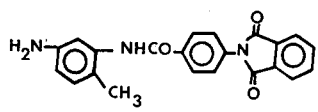 | 1 | orange |
| 192 | " | 4 | red |
| 193 | " | 5 | reddish orange |
| 194 | " | 6 | orange |
| 195 | " | 7 | orange |
| 196 | " | 8 | orange |
| 197 | 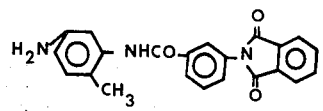 | 1 | red |
| 198 | " | 4 | red |
| 199 | " | 5 | brownish red |
| 200 | " | 6 | brownish red |
| 201 | " | 7 | brownish red |
| 202 | " | 8 | brownish red |

-continued

| Ex. | Amine (formula III) | Diazo component D¹ | Shade |
|---|---|---|---|
| 203 | (H₂N-C₆H₃(CH₃)-NHCO-O-C₆H₃(Cl)-phthalimide) | 1 | bluish red |
| 204 | " | 2 | bluish red |
| 205 | " | 4 | orange |
| 206 | " | 5 | orange |
| 207 | " | 6 | orange |
| 208 | " | 7 | orange |
| 209 | (H₂N-C₆H₃(CH₃)-NHCO-C₆H₃(Cl)-phthalimide) | 1 | orange |
| 210 | " | 2 | orange |
| 211 | " | 4 | yellowish red |
| 212 | " | 5 | yellowish red |
| 213 | " | 7 | yellowish red |
| 214 | " | 8 | yellowish red |
| 215 | (H₂N-C₆H₃(CH₃)-NHCO-O-C₆H₄-tetrachlorophthalimide) | 1 | red |
| 216 | " | 2 | red |
| 217 | " | 4 | red |
| 218 | " | 5 | orange |
| 219 | " | 7 | orange |
| 220 | (H₂N-C₆H₃(CH₃)-NHCO-C₆H₄-tetrachlorophthalimide) | 1 | reddish orange |
| 221 | " | 2 | reddish orange |
| 222 | " | 4 | red |
| 223 | " | 5 | red |
| 224 | " | 7 | red |
| 225 | (H₂N-C₆H₃(CH₃)-NHCO-O-C₆H₃(Cl)-tetrachlorophthalimide) | 1 | bluish red |
| 226 | " | 4 | orange |
| 227 | " | 5 | orange |
| 228 | " | 7 | orange |
| 229 | (H₂N-C₆H₃(CH₃)-NHCO-C₆H₃(Cl)-tetrachlorophthalimide) | 1 | reddish orange |
| 230 | " | 4 | reddish orange |
| 231 | " | 5 | reddish orange |
| 232 | " | 7 | reddish orange |
| 233 | (H₂N-C₆H₃(CH₃)-NHCO-O-C₆H₄-phthalimide) | 1 | orange |

-continued

| Ex. | Amine (formula III) | Diazo component D¹ | Shade |
|---|---|---|---|
| 234 | '' | 4 | yellowish red |
| 235 | '' | 5 | yellowish red |
| 236 | '' | 7 | yellowish red |
| 237 | H₂N—[C₆H₃(CH₃)]—NHCO—[C₆H₄]—N(phthalimide) | 1 | reddish orange |
| 238 | '' | 4 | reddish orange |
| 239 | '' | 5 | bluish red |
| 240 | '' | 7 | red |
| 241 | H₂N—[C₆H₃(CH₃)]—NHCO—[C₆H₃(Cl)]—N(phthalimide) | 1 | bluish red |
| 242 | '' | 2 | red |
| 243 | '' | 4 | orange |
| 244 | '' | 5 | orange |
| 245 | '' | 7 | orange |
| 246 | H₂N—[C₆H₃(CH₃)]—NHCO—[C₆H₃(Cl)]—N(phthalimide) | 1 | red |
| 247 | '' | 2 | red |
| 248 | '' | 4 | yellowish red |
| 249 | '' | 5 | yellowish red |
| 250 | '' | 6 | yellowish red |
| 251 | '' | 7 | yellowish red |
| 252 | H₂N—[C₆H₃(CH₃)]—NHCO—[C₆H₄]—N(tetrachlorophthalimide) | 1 | yellowish red |
| 253 | '' | 4 | red |
| 254 | '' | 5 | yellowish red |
| 255 | '' | 7 | yellowish red |
| 256 | H₂N—[C₆H₃(CH₃)]—NHCO—[C₆H₄]—N(tetrachlorophthalimide) | 1 | reddish orange |
| 257 | '' | 4 | reddish orange |
| 258 | '' | 5 | reddish orange |
| 259 | '' | 7 | reddish orange |
| 260 | H₂N—[C₆H₃(CH₃)]—NHCO—[C₆H₃(Cl)]—N(tetrachlorophthalimide) | 1 | bluish red |
| 261 | '' | 4 | orange |
| 262 | '' | 5 | orange |
| 263 | '' | 7 | orange |

-continued

| Ex. | Amine (formula III) | Diazo component D¹ | Shade |
|---|---|---|---|
| 264 | H₂N–⟨⟩(CH₃)(Cl)–NHCO–⟨⟩(Cl)–N(phthalimide-Cl₄) | 1 | bluish red |
| 265 | " | 4 | red |
| 266 | " | 5 | yellowish red |
| 267 | " | 7 | yellowish red |
| 268 | H₂N–⟨⟩(CH₃)–NHCO–⟨⟩–N(phthalimide) | 1 | bluish red |
| 269 | " | 2 | bluish red |
| 270 | " | 4 | red |
| 271 | " | 5 | orange |
| 272 | " | 6 | orange |
| 273 | " | 7 | yellowish red |
| 274 | " | 8 | yellowish red |
| 275 | H₂N–⟨⟩(CH₃)–NHCO–⟨⟩–N(phthalimide) (meta) | 1 | bluish red |
| 276 | " | 2 | bluish red |
| 277 | " | 4 | orange |
| 278 | " | 5 | orange |
| 279 | " | 6 | orange |
| 280 | " | 7 | orange |
| 281 | " | 8 | orange |
| 282 | H₂N–⟨⟩(CH₃)–NHCO–⟨⟩(Cl)–N(phthalimide) | 1 | bluish red |
| 283 | " | 2 | red |
| 284 | " | 4 | orange |
| 285 | " | 5 | reddish orange |
| 286 | " | 6 | reddish orange |
| 287 | " | 7 | reddish orange |
| 288 | " | 8 | reddish orange |
| 289 | H₂N–⟨⟩(CH₃)–NHCO–⟨⟩(Cl)–N(phthalimide) | 1 | bluish red |
| 290 | " | 4 | reddish orange |
| 291 | " | 5 | reddish orange |
| 292 | " | 6 | reddish orange |
| 293 | " | 7 | reddish orange |
| 294 | " | 8 | reddish orange |
| 295 | H₂N–⟨⟩(CH₃)–NHCO–⟨⟩–N(phthalimide-Cl₄) | 1 | bluish red |

-continued

| Ex. | Amine (formula III) | Diazo component D¹ | Shade |
|---|---|---|---|
| 296 | " | 2 | red |
| 297 | " | 4 | orange |
| 298 | " | 5 | orange |
| 299 | " | 6 | orange |
| 300 | " | 7 | orange |
| 301 | " | 8 | orange |
| 302 | H₂N–C₆H₃(CH₃)–NHCO–C₆H₄–N(phthalimide tetrachloro) | 1 | violet |
| 303 | " | 4 | yellowish red |
| 304 | " | 5 | yellowish red |
| 305 | " | 7 | yellowish red |
| 306 | H₂N–C₆H₃(CH₃)–NHCO–C₆H₃(Cl)–N(phthalimide tetrachloro) | 1 | bluish red |
| 307 | " | 4 | orange |
| 308 | " | 5 | orange |
| 309 | " | 7 | orange |
| 310 | H₂N–C₆H₃(CH₃)–NHCO–C₆H₃(Cl)–N(phthalimide dichloro) | 1 | bluish red |
| 311 | " | 4 | reddish orange |
| 312 | " | 5 | red |
| 313 | " | 7 | red |
| 314 | H₂N–C₆H₃(CH₃)–NHCO–C₆H₄–N(phthalimide) | 1 | bluish red |
| 315 | " | 2 | red |
| 316 | " | 4 | bluish red |
| 317 | " | 5 | reddish orange |
| 318 | " | 6 | reddish orange |
| 319 | " | 7 | reddish orange |
| 320 | " | 8 | reddish orange |
| 321 | H₂N–C₆H₃(CH₃)–NHCO–C₆H₄–N(phthalimide) (isomer) | 1 | bluish red |
| 322 | " | 4 | orange |
| 323 | " | 5 | reddish orange |
| 324 | " | 7 | reddish orange |

-continued

| Ex. | Amine (formula III) | Diazo component D¹ | Shade |
|---|---|---|---|
| 325 | (2-amino-4-methyl-phenyl with NHCO linked to 4-chloro-phenyl-N-phthalimide) | 1 | bluish red |
| 326 | " | 4 | orange |
| 327 | " | 5 | orange |
| 328 | " | 7 | orange |
| 329 | (2-amino-4-methyl-phenyl with NHCO linked to 2-chloro-phenyl-N-phthalimide) | 1 | bluish red |
| 330 | " | 2 | red |
| 331 | " | 4 | orange |
| 332 | " | 5 | red |
| 333 | " | 7 | reddish orange |
| 334 | (2-amino-4-methyl-phenyl with NHCO linked to phenyl-N-tetrachlorophthalimide) | 1 | bluish red |
| 335 | " | 4 | orange |
| 336 | " | 5 | orange |
| 337 | " | 7 | orange |
| 338 | (2-amino-4-methyl-phenyl with NHCO linked to phenyl-N-tetrachlorophthalimide, meta) | 1 | bluish red |
| 339 | " | 4 | orange |
| 340 | " | 5 | reddish orange |
| 341 | " | 7 | reddish orange |
| 342 | (2-amino-4-methyl-phenyl with NHCO linked to 2-chloro-phenyl-N-tetrachlorophthalimide) | 1 | bluish red |

-continued

| Ex. | Amine (formula III) | Diazo component D¹ | Shade |
|---|---|---|---|
| 343 | '' | 4 | yellowish red |
| 344 | '' | 5 | yellowish red |
| 345 | '' | 7 | yellowish red |
| 346 | H₂N–C₆H₃(CH₃)–NHCO–C₆H₃(Cl)–N(tetrachlorophthalimide) | 1 | bluish red |
| 347 | '' | 4 | orange |
| 348 | '' | 5 | red |
| 349 | '' | 7 | red |
| 350 | H₂N–C₆H₃(OCH₃)–NHCO–C₆H₄–N(phthalimide) | 1 | bluish red |
| 351 | '' | 4 | bluish red |
| 352 | '' | 5 | reddish brown |
| 353 | '' | 7 | reddish brown |
| 354 | H₂N–C₆H₃(OCH₃)–NHCO–C₆H₄–N(phthalimide) | 1 | bluish red |
| 355 | '' | 2 | red |
| 356 | '' | 4 | Yellowish red |
| 357 | '' | 5 | reddish brown |
| 358 | '' | 7 | orange |
| 359 | H₂N–C₆H₃(OCH₃)–NHCO–C₆H₃(Cl)–N(phthalimide) | 1 | violet |
| 360 | '' | 2 | reddish brown |
| 361 | '' | 4 | brown |
| 362 | '' | 5 | brown |
| 363 | '' | 7 | brown |
| 364 | H₂N–C₆H₃(OCH₃)–NHCO–C₆H₃(Cl)–N(phthalimide) | 1 | brown |
| 365 | '' | 4 | bluish red |
| 366 | '' | 5 | bluish red |
| 367 | '' | 6 | bluish red |
| 368 | '' | 7 | bluish red |
| 369 | '' | 8 | bluish red |
| 370 | H₂N–C₆H₃(OCH₃)–NHCO–C₆H₄–N(tetrachlorophthalimide) | 1 | violet |

-continued

| Ex. | Amine (formula III) | Diazo component D¹ | Shade |
|---|---|---|---|
| 371 | " | 4 | brown |
| 372 | " | 5 | brown |
| 373 | " | 7 | brown |
| 374 | H₂N–C₆H₃(OCH₃)–NHCO–C₆H₄–N(phthalimide-Cl₄) | 1 | brown |
| 375 | " | 4 | orange |
| 376 | " | 5 | bluish red |
| 377 | " | 7 | bluish red |
| 378 | H₂N–C₆H₃(OCH₃)–NHCO–C₆H₃(Cl)–N(phthalimide-Cl₄) | 1 | violet |
| 379 | " | 4 | brown |
| 380 | " | 5 | brown |
| 381 | " | 7 | brown |
| 382 | H₂N–C₆H₃(OCH₃)–NHCO–C₆H₃(Cl)–N(phthalimide-Cl₄) | 1 | brown |
| 383 | " | 4 | bluish red |
| 384 | " | 5 | bluish red |
| 385 | " | 6 | bluish red |
| 386 | " | 7 | bluish red |
| 387 | " | 8 | bluish red |
| 388 | H₂N–C₆H₃(OCH₃)–NHCO–C₆H₄–N(phthalimide) | 1 | bluish red |
| 389 | " | 2 | red |
| 390 | " | 4 | reddish brown |
| 391 | " | 5 | red |
| 392 | " | 7 | reddish brown |
| 393 | " | 8 | red |
| 394 | H₂N–C₆H₃(OCH₃)–NHCO–C₆H₄–N(phthalimide) | 1 | violet |
| 395 | " | 2 | red |
| 396 | " | 4 | red |
| 397 | " | 5 | reddish brown |
| 398 | " | 6 | red |
| 399 | " | 7 | reddish orange |
| 400 | " | 8 | reddish orange |
| 401 | H₂N–C₆H₃(OCH₃)–NHCO–C₆H₃(Cl)–N(phthalimide) | 1 | violet |
| 402 | " | 4 | bluish red |
| 403 | " | 5 | bluish red |
| 404 | " | 6 | bluish red |
| 405 | " | 7 | bluish red |
| 406 | " | 8 | bluish red |

-continued

| Ex. | Amine (formula III) | Diazo component D¹ | Shade |
|---|---|---|---|
| 407 | H₂N–⟨ring, OCH₃⟩–NHCO–⟨ring, Cl⟩–N(phthalimide) | 1 | bluish red |
| 408 | '' | 2 | red |
| 409 | '' | 4 | red |
| 410 | '' | 5 | red |
| 411 | '' | 7 | red |
| 412 | H₂N–⟨ring, OCH₃⟩–NHCO–⟨ring⟩–N(tetrachlorophthalimide) | 1 | bluish red |
| 413 | '' | 4 | bluish red |
| 414 | '' | 5 | red |
| 415 | '' | 7 | reddish brown |
| 416 | H₂N–⟨ring, OCH₃⟩–NHCO–⟨ring, meta⟩–N(tetrachlorophthalimide) | 1 | violet |
| 417 | '' | 4 | bluish red |
| 418 | '' | 5 | violet |
| 419 | '' | 7 | violet |
| 420 | H₂N–⟨ring, OCH₃⟩–NHCO–⟨ring, Cl⟩–N(tetrachlorophthalimide) | 1 | bluish red |
| 421 | '' | 4 | bluish red |
| 422 | '' | 5 | bluish red |
| 423 | '' | 7 | bluish red |
| 424 | H₂N–⟨ring, OCH₃⟩–NHCO–⟨ring, Cl⟩–N(tetrachlorophthalimide) | 1 | bluish red |
| 425 | '' | 2 | red |
| 426 | '' | 4 | bluish red |
| 427 | '' | 5 | red |
| 428 | '' | 7 | red |
| 429 | H₂N–⟨ring, OC₂H₅⟩–NHCO–⟨ring⟩–N(phthalimide) | 1 | bluish red |
| 430 | '' | 2 | red |
| 431 | '' | 4 | orange |
| 432 | '' | 5 | red |
| 433 | '' | 6 | red |
| 434 | '' | 7 | red |

-continued

| Ex. | Amine (formula III) | Diazo component D¹ | Shade |
|---|---|---|---|
| 435 | '' | 8 | red |
| 436 | H₂N-[benzene with HNCO-phenyl-phthalimide and OC₂H₅] | 1 | bluish red |
| 437 | '' | 2 | red |
| 438 | '' | 4 | red |
| 439 | '' | 5 | red |
| 440 | '' | 7 | red |
| 441 | '' | 8 | red |
| 442 | H₂N-[benzene with NHCO-phenyl(Cl)-phthalimide and OC₂H₅] | 1 | bluish red |
| 443 | '' | 2 | red |
| 444 | '' | 4 | orange |
| 445 | '' | 5 | orange |
| 446 | '' | 6 | orange |
| 447 | '' | 7 | orange |
| 448 | '' | 8 | orange |
| 449 | H₂N-[benzene with NHCO-phenyl(Cl)-phthalimide and OC₂H₅] | 1 | bluish red |
| 450 | '' | 2 | red |
| 451 | '' | 4 | yellowish red |
| 452 | '' | 5 | red |
| 453 | '' | 6 | red |
| 454 | '' | 7 | red |
| 455 | '' | 8 | yellowish red |
| 456 | H₂N-[benzene with NHCO-phenyl-tetrachlorophthalimide and OC₂H₅] | 1 | bluish red |
| 457 | '' | 2 | red |
| 458 | '' | 3 | yellowish red |
| 459 | '' | 5 | red |
| 460 | '' | 7 | red |

-continued

| Ex. | Amine (formula III) | Diazo component D¹ | Shade |
|---|---|---|---|
| 461 | H₂N–C₆H₃(OC₂H₅)–NHCO–C₆H₃–N(tetrachlorophthalimide) | 1 | bluish red |
| 462 | '' | 2 | bluish red |
| 463 | '' | 4 | yellowish red |
| 464 | '' | 5 | yellowish red |
| 465 | '' | 7 | yellowish red |
| 466 | H₂N–C₆H₃(OC₂H₅)–NHCO–C₆H₃(Cl)–N(tetrachlorophthalimide) | 1 | bluish red |
| 467 | '' | 2 | red |
| 468 | '' | 4 | orange |
| 469 | '' | 5 | orange |
| 470 | '' | 6 | orange |
| 471 | '' | 7 | orange |
| 472 | H₂N–C₆H₃(OC₂H₅)–NHCO–C₆H₃(Cl)–N(tetrachlorophthalimide) | 1 | bluish red |
| 473 | '' | 4 | yellowish red |
| 474 | '' | 5 | yellowish red |
| 475 | '' | 7 | yellowish red |
| 476 | H₂N–C₆H₃(OC₂H₅)–NHCO–C₆H₄–N(phthalimide) | 1 | bluish red |
| 477 | '' | 2 | bluish red |
| 478 | '' | 4 | red |
| 479 | '' | 5 | red |
| 480 | '' | 7 | red |
| 481 | H₂N–C₆H₃(OC₂H₅)–NHCO–C₆H₄–N(phthalimide) | 1 | red |
| 482 | '' | 4 | red |
| 483 | '' | 5 | red |
| 484 | '' | 7 | red |
| 485 | H₂N–C₆H₃(OC₂H₅)–NHCO–C₆H₃(Cl)–N(phthalimide) | 1 | bluish red |
| 486 | '' | 4 | red |
| 487 | '' | 5 | red |
| 488 | '' | 7 | red |

-continued

| Ex. | Amine (formula III) | Diazo component D¹ | Shade |
|---|---|---|---|
| 489 | " | 8 | red |
| 490 | H₂N—⟨⟩—NHCO—⟨⟩—N(phthalimide), with OC₂H₅ on left ring and Cl on middle ring | 1 | bluish red |
| 491 | " | 4 | bluish red |
| 492 | " | 5 | red |
| 493 | " | 7 | red |
| 494 | H₂N—⟨⟩—NHCO—⟨⟩—N(tetrachlorophthalimide), with OC₂H₅ on left ring | 1 | bluish red |
| 495 | " | 4 | red |
| 496 | " | 5 | red |
| 497 | " | 7 | red |
| 498 | H₂N—⟨⟩—NHCO—⟨⟩—N(tetrachlorophthalimide), with OC₂H₅ on left ring (meta isomer) | 1 | red |
| 499 | " | 4 | red |
| 500 | " | 5 | red |
| 501 | H₂N—⟨⟩—NHCO—⟨⟩—N(tetrachlorophthalimide), with OC₂H₅ on left ring and Cl on middle ring | 1 | bluish red |
| 502 | " | 4 | red |
| 503 | " | 5 | red |
| 504 | H₂N—⟨⟩—NHCO—⟨⟩—N(tetrachlorophthalimide), with OC₂H₅ on left ring and Cl on middle ring | 1 | bluish red |
| 505 | " | 4 | red |
| 506 | " | 5 | red |
| 507 | " | 6 | red |
| 508 | " | 7 | reddish orange |
| 509 | " | 8 | yellowish red |
| 510 | H₂N—⟨⟩—NHCO—⟨⟩—N(phthalimide), with SO₂C₂H₅ and Cl substituents | 1 | bluish red |
| 511 | " | 2 | red |
| 512 | " | 4 | red |
| 513 | " | 5 | orange |
| 514 | " | 6 | orange |
| 515 | " | 7 | orange |
| 516 | H₂N—⟨⟩—NHCO—⟨⟩—N(phthalimide), with SO₂C₂H₅ substituent | 1 | bluish red |

-continued

| Ex. | Amine (formula III) | Diazo component D¹ | Shade |
|---|---|---|---|
| 517 | '' | 4 | red |
| 518 | '' | 6 | red |
| 519 | '' | 7 | red |
| 520 | H₂N–⟨⟩–NHCO–⟨⟩–N(phthalimide), with CH₃ and SO₂C₂H₅ on first ring, Cl on second ring | 1 | bluish red |
| 521 | '' | 4 | red |
| 522 | '' | 5 | red |
| 523 | '' | 7 | red |
| 524 | H₂N–⟨⟩–NHCO–⟨⟩–N(phthalimide), with Cl and SO₂C₂H₅ on first ring, Cl on second ring | 1 | bluish red |
| 525 | '' | 4 | bluish red |
| 526 | '' | 5 | red |
| 527 | '' | 7 | red |
| 528 | H₂N–⟨⟩–NHCO–⟨⟩–N(tetrachlorophthalimide), with SO₂C₂H₅ | 1 | bluish red |
| 529 | '' | 4 | red |
| 530 | '' | 5 | yellowish red |
| 531 | '' | 7 | yellowish red |
| 532 | H₂N–⟨⟩–NHCO–⟨⟩–N(tetrachlorophthalimide), with SO₂C₂H₅ | 1 | bluish red |
| 533 | '' | 4 | bluish red |
| 534 | '' | 5 | red |
| 535 | '' | 7 | red |
| 536 | H₂N–⟨⟩–NHCO–⟨⟩–N(tetrachlorophthalimide), with SO₂C₂H₅ on first ring, Cl on second ring | 1 | bluish red |
| 537 | '' | 4 | red |
| 538 | '' | 5 | red |
| 539 | '' | 7 | red |
| 540 | H₂N–⟨⟩–NHCO–⟨⟩–N(tetrachlorophthalimide), with Cl and SO₂C₂H₅ on first ring | 1 | bluish red |
| 541 | '' | 4 | bluish red |
| 542 | '' | 5 | bluish red |
| 543 | '' | 7 | bluish red |
| 544 | H₂N–⟨⟩–NHCO–⟨⟩–N(phthalimide) | 1 | bluish red |

-continued

| Ex. | Amine (formula III) | Diazo component D¹ | Shade |
|---|---|---|---|
| 545 | " | 2 | bluish red |
| 546 | " | 4 | orange |
| 547 | " | 5 | orange |
| 548 | " | 6 | orange |
| 549 | " | 7 | orange |
| 550 | " | 8 | yellowish red |
| 551 | H₂N–C₆H₄(NHCO)–C₆H₃–N(phthalimide) | 1 | bluish red |
| 552 | " | 4 | red |
| 553 | " | 5 | red |
| 554 | " | 6 | yellowish red |
| 555 | " | 7 | yellowish red |
| 556 | H₂N–C₆H₄(NHCO)–C₆H₃(Cl)–N(phthalimide) | 1 | bluish red |
| 557 | " | 2 | bluish red |
| 558 | " | 4 | orange |
| 559 | " | 5 | orange |
| 560 | " | 7 | orange |
| 561 | H₂N–C₆H₄(NHCO)–C₆H₃(Cl)–N(phthalimide) | 1 | bluish red |
| 562 | " | 4 | red |
| 563 | " | 5 | red |
| 564 | " | 7 | red |
| 565 | H₂N–C₆H₄(NHCO)–C₆H₄–N(tetrachlorophthalimide) | 1 | bluish red |
| 566 | " | 4 | orange |
| 567 | " | 5 | yellowish red |
| 568 | " | 7 | yellowish red |
| 569 | H₂N–C₆H₄(NHCO)–C₆H₄–N(tetrachlorophthalimide) | 1 | bluish red |
| 570 | " | 4 | red |
| 571 | " | 5 | yellowish red |
| 572 | " | 7 | red |
| 573 | H₂N–C₆H₄(NHCO)–C₆H₃(Cl)–N(tetrachlorophthalimide) | 1 | bluish red |

| Ex. | Amine (formula III) | Diazo component D¹ | Shade |
|---|---|---|---|
| 574 | '' | 4 | orange |
| 575 | '' | 5 | reddish orange |
| 576 | '' | 7 | reddish orange |
| 577 | [structure: diaminochloro-NHCO-phenyl-N-tetrachlorophthalimide] | 1 | bluish red |
| 578 | '' | 4 | red |
| 579 | '' | 5 | red |
| 580 | '' | 7 | red |
| 581 | [structure: H₂N-chloroaniline-NHCO-phenyl-N-phthalimide] | 1 | bluish red |
| 582 | '' | 2 | bluish red |
| 583 | '' | 4 | orange |
| 584 | '' | 5 | red |
| 585 | '' | 6 | red |
| 586 | '' | 7 | red |
| 587 | '' | 8 | yellowish red |
| 588 | [structure: H₂N-chloroaniline-NHCO-phenyl-N-phthalimide] | 1 | red |
| 589 | '' | 4 | yellowish red |
| 590 | '' | 5 | red |
| 591 | '' | 7 | red |
| 592 | [structure: H₂N-dichloroaniline-NHCO-chlorophenyl-N-phthalimide] | 1 | bluish red |
| 593 | '' | 4 | orange |
| 594 | '' | 5 | orange |
| 595 | '' | 6 | orange |
| 596 | '' | 7 | orange |
| 597 | '' | 8 | orange |
| 598 | [structure: H₂N-dichloroaniline-NHCO-chlorophenyl-N-phthalimide] | 1 | bluish red |

-continued

| Ex. | Amine (formula III) | Diazo component D¹ | Shade |
|---|---|---|---|
| 599 | " | 4 | orange |
| 600 | " | 5 | red |
| 601 | " | 6 | yellowish red |
| 602 | " | 7 | orange |
| 603 | H₂N–(2-amino-4-chlorophenyl)–NHCO–(phenyl)–N(tetrachlorophthalimide) | 1 | bluish red |
| 604 | " | 4 | orange |
| 605 | " | 5 | red |
| 606 | " | 7 | red |
| 607 | H₂N–(2-amino-4-chlorophenyl)–NHCO–(meta-phenyl)–N(tetrachlorophthalimide) | 1 | bluish red |
| 608 | " | 4 | orange |
| 609 | " | 5 | orange |
| 610 | " | 7 | orange |
| 611 | H₂N–(2-amino-4-chlorophenyl)–NHCO–(phenyl)–N(tetrachlorophthalimide) | 1 | bluish red |
| 612 | " | 4 | orange |
| 613 | " | 5 | orange |
| 614 | " | 7 | orange |
| 615 | H₂N–(2-amino-4-chlorophenyl)–NHCO–(chlorophenyl)–N(tetrachlorophthalimide) | 1 | bluish red |
| 616 | " | 4 | orange |
| 617 | " | 5 | red |
| 618 | " | 6 | red |
| 619 | " | 7 | reddish orange |

-continued
| Ex. | Amine (formula III) | Diazo component D¹ | Shade |
|---|---|---|---|
| 620 | 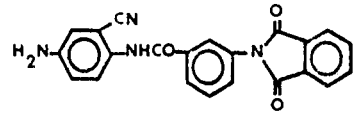 | 1 | bluish red |
| 621 | '' | 4 | reddish brown |
| 622 | '' | 5 | reddish brown |
| 623 | '' | 7 | reddish brown |
| 624 | 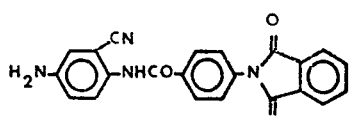 | 1 | red |
| 625 | '' | 4 | red |
| 626 | '' | 5 | yellowish red |
| 627 | '' | 7 | yellowish red |
| 628 | 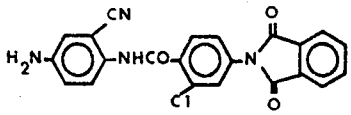 | 1 | red |
| 629 | '' | 4 | orange |
| 630 | '' | 5 | orange |
| 631 | '' | 7 | orange |
| 632 | 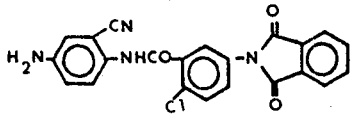 | 1 | red |
| 633 | '' | 4 | red |
| 634 | '' | 5 | red |
| 635 | '' | 7 | red |
| 636 | 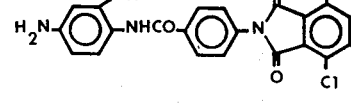 | 1 | bluish red |
| 637 | '' | 4 | reddish brown |
| 638 | '' | 5 | reddish brown |
| 639 | '' | 7 | reddish brown |
| 640 | 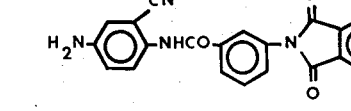 | 1 | red |
| 641 | '' | 4 | red |
| 642 | '' | 5 | red |
| 643 | '' | 7 | red |
| 644 | 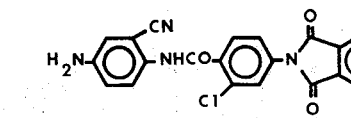 | 1 | bluish red |
| 645 | '' | 4 | orange |
| 646 | '' | 5 | orange |
| 647 | '' | 7 | orange |

-continued

| Ex. | Amine (formula III) | Diazo component D¹ | Shade |
|---|---|---|---|
| 648 | (2-cyano-4-amino-phenyl)-NHCO-(4-tetrachlorophthalimido-3-chlorophenyl) | 1 | bluish red |
| 649 | " | 4 | orange |
| 650 | " | 5 | red |
| 651 | " | 7 | red |
| 652 | (2-methylsulfonyl-4-amino-phenyl)-NHCO-(4-phthalimidophenyl) | 1 | bluish red |
| 653 | " | 4 | red |
| 654 | " | 5 | orange |
| 655 | " | 7 | orange |
| 656 | (3-methylsulfonyl-4-amino-phenyl)-NHCO-(3-phthalimidophenyl) | 1 | bluish red |
| 657 | " | 2 | bluish red |
| 658 | " | 4 | bluish red |
| 659 | " | 5 | red |
| 660 | " | 6 | red |
| 661 | " | 7 | red |
| 662 | (4-amino-phenyl)-NHCO-(3-chloro-4-methyl-6-methylsulfonyl-phthalimido-phenyl) | 1 | bluish red |
| 663 | " | 2 | red |
| 664 | " | 4 | red |
| 665 | " | 5 | red |
| 666 | " | 6 | red |
| 667 | " | 7 | red |
| 668 | (2-methylsulfonyl-4-amino-phenyl)-NHCO-(2-chloro-phthalimido-phenyl) | 1 | bluish red |
| 669 | " | 2 | red |
| 670 | " | 4 | bluish red |
| 671 | " | 5 | red |
| 672 | " | 6 | red |
| 673 | " | 7 | red |
| 674 | " | 8 | red |
| 675 | (2-methylsulfonyl-4-amino-phenyl)-NHCO-(4-tetrachlorophthalimido-phenyl) | 1 | bluish red |
| 676 | " | 4 | red |
| 677 | " | 5 | yellowish red |
| 678 | " | 7 | yellowish red |

-continued

| Ex. | Amine (formula III) | Diazo component D¹ | Shade |
|---|---|---|---|
| 679 | H₂N–C₆H₃(SO₂CH₃)–NHCO–C₆H₄–N(tetrachlorophthalimide) | 1 | bluish red |
| 680 | " | 4 | bluish red |
| 681 | " | 5 | red |
| 682 | " | 7 | red |
| 683 | H₂N–C₆H₃(SO₂CH₃)–NHCO–C₆H₃(Cl)–N(tetrachlorophthalimide) | 1 | bluish red |
| 684 | " | 4 | bluish red |
| 685 | " | 5 | red |
| 686 | " | 7 | red |
| 687 | H₂N–C₆H₃(SO₂CH₃)–NHCO–C₆H₃(Cl)–N(tetrachlorophthalimide) | 1 | bluish red |
| 688 | " | 2 | bluish red |
| 689 | " | 4 | bluish red |
| 690 | " | 5 | red |
| 691 | " | 7 | red |
| 692 | H₂N–C₆H₂(OCH₃)(OCH₃)–NHCO–C₆H₄–N(phthalimide) | 1 | reddish brown |
| 693 | " | 4 | reddish brown |
| 694 | " | 5 | reddish brown |
| 695 | " | 7 | reddish brown |
| 696 | H₂N–C₆H₂(OCH₃)(OCH₃)–NHCO–C₆H₄–N(phthalimide) | 1 | violet |
| 697 | " | 4 | reddish brown |
| 698 | " | 5 | bluish red |
| 699 | " | 7 | reddish brown |
| 700 | H₂N–C₆H₂(OCH₃)(OCH₃)–NHCO–C₆H₃(Cl)–N(phthalimide) | 1 | Bordeaux |
| 701 | " | 4 | reddish brown |
| 702 | " | 5 | reddish brown |
| 703 | " | 7 | reddish brown |
| 704 | H₂N–C₆H₂(OCH₃)(OCH₃)–NHCO–C₆H₃(Cl)–N(phthalimide) | 1 | Bordeaux |

-continued

| Ex. | Amine (formula III) | Diazo component D¹ | Shade |
|---|---|---|---|
| 705 | " | 4 | reddish brown |
| 706 | " | 5 | reddish brown |
| 707 | " | 7 | reddish brown |
| 708 | H₂N–C₆H₂(OCH₃)(OCH₃)–NHCO–C₆H₄–N(tetrachlorophthalimide) | 1 | reddish brown |
| 709 | " | 4 | reddish brown |
| 710 | H₂N–C₆H₂(OCH₃)(OCH₃)–NHCO–C₆H₄–N(tetrachlorophthalimide) | 1 | violet |
| 711 | " | 4 | reddish brown |
| 712 | H₂N–C₆H₂(OCH₃)(OCH₃)–NHCO–C₆H₃(Cl)–N(tetrachlorophthalimide) | 1 | reddish violet |
| 713 | " | 4 | reddish brown |
| 714 | H₂N–C₆H₂(OCH₃)(OCH₃)–NHCO–C₆H₃(Cl)–N(tetrachlorophthalimide) | 1 | brown |
| 715 | " | 4 | reddish brown |
| 716 | H₂N–C₆H₂(CH₃)(OCH₃)–NHCO–C₆H₄–N(phthalimide) | 1 | bluish red |
| 717 | " | 4 | red |
| 718 | " | 5 | reddish orange |
| 719 | " | 7 | reddish orange |
| 720 | H₂N–C₆H₂(CH₃)(OCH₃)–NHCO–C₆H₄–N(phthalimide) | 1 | bluish red |
| 721 | " | 4 | orange |
| 722 | " | 5 | orange |
| 723 | " | 7 | orange |

| Ex. | Amine (formula III) | Diazo component D¹ | Shade |
|---|---|---|---|
| 724 | (4-amino-5-methyl-2-methoxy-phenyl)-NHCO-(2-chloro-4-phthalimido-phenyl) | 1 | bluish red |
| 725 | " | 4 | orange |
| 726 | " | 5 | yellowish red |
| 727 | " | 7 | yellowish red |
| 728 | (4-amino-5-methyl-2-methoxy-phenyl)-NHCO-(3-chloro-4-phthalimido-phenyl) | 1 | bluish red |
| 729 | " | 4 | red |
| 730 | " | 5 | reddish orange |
| 731 | " | 7 | reddish orange |
| 732 | (4-amino-5-methyl-2-methoxy-phenyl)-NHCO-(4-(tetrachlorophthalimido)-phenyl) | 1 | bluish red |
| 733 | " | 4 | red |
| 734 | " | 5 | reddish orange |
| 735 | " | 7 | reddish orange |
| 736 | (4-amino-5-methyl-2-methoxy-phenyl)-NHCO-(3-(tetrachlorophthalimido)-phenyl) | 1 | bluish red |
| 737 | " | 4 | orange |
| 738 | " | 5 | yellowish red |
| 739 | " | 7 | yellowish red |
| 740 | (4-amino-5-methyl-2-methoxy-phenyl)-NHCO-(2-chloro-4-(tetrachlorophthalimido)-phenyl) | 1 | bluish red |
| 741 | " | 4 | orange |
| 742 | " | 5 | yellowish red |
| 743 | " | 7 | yellowish red |
| 744 | (4-amino-5-methyl-2-methoxy-phenyl)-NHCO-(3-chloro-4-(tetrachlorophthalimido)-phenyl) | 1 | bluish red |
| 745 | " | 4 | red |
| 746 | " | 5 | reddish orange |
| 747 | " | 7 | reddish orange |

-continued

| Ex. | Amine (formula III) | Diazo component D¹ | Shade |
|---|---|---|---|
| 748 | H₂N–(Cl, OCH₃)–C₆H₂–NHCO–C₆H₄–N(phthalimide) | 1 | bluish red |
| 749 | '' | 2 | red |
| 750 | '' | 4 | red |
| 751 | '' | 5 | red |
| 752 | '' | 6 | reddish orange |
| 753 | '' | 7 | reddish orange |
| 754 | H₂N–(Cl, OCH₃)–C₆H₂–NHCO–C₆H₄–N(phthalimide) (meta linkage) | 1 | bluish red |
| 755 | '' | 4 | reddish orange |
| 756 | '' | 5 | red |
| 757 | '' | 7 | red |
| 758 | H₂N–(Cl, OCH₃)–C₆H₂–NHCO–C₆H₃(Cl)–N(phthalimide) | 1 | bluish red |
| 759 | '' | 2 | red |
| 760 | '' | 4 | orange |
| 761 | '' | 5 | orange |
| 762 | '' | 6 | orange |
| 763 | '' | 7 | orange |
| 764 | '' | 8 | orange |
| 765 | H₂N–(Cl, OCH₃)–C₆H₂–NHCO–C₆H₃(Cl)–N(phthalimide) | 1 | bluish red |
| 766 | '' | 4 | yellowish red |
| 767 | '' | 5 | red |
| 768 | '' | 6 | red |
| 769 | '' | 7 | red |
| 770 | H₂N–(Cl, OCH₃)–C₆H₂–NHCO–C₆H₄–N(tetrachlorophthalimide) | 1 | bluish red |
| 771 | '' | 4 | orange |
| 772 | '' | 5 | orange |
| 773 | '' | 7 | yellowish red |
| 774 | H₂N–(Cl, OCH₃)–C₆H₂–NHCO–C₆H₃(Cl)–N(tetrachlorophthalimide) | 1 | bluish red |
| 775 | '' | 4 | red |
| 776 | '' | 5 | red |
| 777 | H₂N–(Cl, OCH₃)–C₆H₂–NHCO–C₆H₃(Cl)–N(tetrachlorophthalimide) | 1 | bluish red |
| 778 | '' | 4 | orange |

-continued

| Ex. | Amine (formula III) | Diazo component D¹ | Shade |
|---|---|---|---|
| 779 | " | 5 | red |
| 780 | H₂N–(2-Cl,5-OCH₃-phenyl)–NHCO–(2,5-Cl-phenyl)–N(tetrachlorophthalimide) | 1 | bluish red |
| 781 | " | 4 | orange |
| 782 | " | 5 | red |
| 783 | H₂N–(2,5-Cl-phenyl)–NHCO–(phenyl)–N(phthalimide) | 1 | bluish red |
| 784 | H₂N–(2,6-Cl-phenyl)–NHCO–(phenyl)–N(phthalimide) | 1 | bluish red |
| 785 | H₂N–(2,5-Cl-phenyl)–NHCO–(2-Cl-phenyl)–N(phthalimide) | 1 | bluish red |
| 786 | " | 4 | bluish red |
| 787 | H₂N–(2,5-Cl-phenyl)–NHCO–(3-Cl-phenyl)–N(phthalimide) | 1 | bluish red |
| 788 | " | 4 | reddish orange |
| 789 | " | 5 | reddish orange |
| 790 | H₂N–(2-Cl,5-CH₃-phenyl)–NHCO–(phenyl)–N(phthalimide) | 1 | bluish red |
| 791 | H₂N–(2-Cl,6-CH₃-phenyl)–NHCO–(phenyl)–N(phthalimide) | 1 | red |
| 792 | " | 4 | red |
| 793 | " | 5 | red |

-continued

| Ex. | Amine (formula III) | Diazo component D¹ | Shade |
|---|---|---|---|
| 794 | ![structure with H₂N, Cl, CH₃, NHCO, Cl, phthalimide-cyclohexane] | 1 | bluish red |
| 795 | " | 4 | yellowish orange |
| 796 | ![structure with H₂N, Cl, CH₃, NHCO, Cl, phthalimide] | 1 | bluish red |
| 797 | " | 4 | reddish orange |
| 798 | " | 5 | red |

EXAMPLE 799

347 parts of the carboxylic acid obtained by coupling diazotized o-nitroaniline with 2-hydroxynaphthoic acid-(3) is heated slowly (in the course of two hours) to 110° together with 1500 parts of nitrobenzene, 236 parts of thionyl chloride and 2 to 5 parts of dimethylformamide and kept at this temperature for 3 hours. The precipitate obtained on cooling is filtered off, washed with a little nitrobenzene and then with cyclohexane, and dried at 80° under subatmospheric pressure.

36.5 parts of the acid chloride thus obtained in stirred in 500 parts of dry o-dichlorobenzene and mixed with 38 parts of the amine of the formula

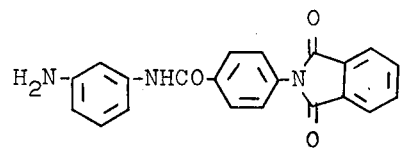

and 10 parts of dimethylformamide. The mixture is heated for one hour at 80°, for 2 hours at 110° and for 3 hours at 130° and then filtered while hot. The residue is washed with toluene, glycol monomethyl ether and methanol. After drying at 80° under subatmospheric pressure 64 parts of the yellowish red pigment of the formula

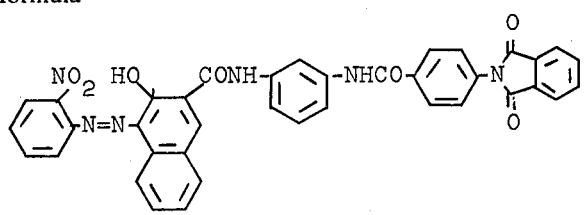

is obtained.

Further monoazo pigments may be prepared by following the method of Example 799 and using the diazo components D¹ specified in the table. The third column gives the color of the pigment.

| Ex. | Diazo component D¹ | Color |
|---|---|---|
| 800 | $O_2N$—⟨Ph⟩—Cl | orange |
| 801 | $O_2N$—⟨Ph⟩—CN | yellowish red |
| 802 | $O_2N$—⟨Ph⟩—OCH₃ | red |
| 803 | $O_2N$—⟨Ph⟩—CH₃ | orange |
| 804 | $H_3C$—⟨Ph⟩—NO₂ | yellowish red |
| 805 | Cl—⟨Ph⟩—NO₂ | orange |
| 806 | $O_2N$—⟨Ph⟩—Cl | yellowish red |
| 807 | ⟨Ph⟩ with CH₃ and NO₂ | orange |

-continued

| Ex. | Diazo component D¹ | Color |
|---|---|---|
| 808 | Cl-⟨O⟩- with O₂N | orange |
| 809 | Cl-⟨O⟩- with CN | yellowish red |
| 810 | Cl-⟨O⟩- with SO₂CH₃ | reddish orange |
| 811 | ⟨O⟩- with CO₂CH₃ | orange |
| 812 | ⟨O⟩- with H₃CO₂C and CO₂CH₃ | orange |
| 813 | ⟨O⟩- with CN and CH₃ | orange |
| 814 | ⟨O⟩- with CN and Cl | yellowish red |
| 815 | ⟨O⟩- with CN and OCH₃ | red |

APPLICATION

EXAMPLE 1: in surface coatings 5 parts of the dye of Example 1 and 95 parts of a coating composition of the baking type (e.g. 70% coconut alkyd resin (60% in xylene) and 30% melamine resin (approx. 55% in butanol/xylene)) are treated in an attritor mill. After application and approx. 30 minutes baking at 120° bright full-color coatings having very good fastness to light and overcoating are obtained. Reduction with e.g., titanium dioxide gives bright shades. Similar coatings may be produced by using the other pigments specified in Examples.

EXAMPLE 2: in printing inks 5 parts of the dye of Example 2, 30 to 40 parts of resin (e.g., rosin modified with phenolformaldehyde) and 55 zo 65 parts of toluene are intimately mixed in a dispersing unit. A toluene intaglio printing ink having outstanding fastness to light and excellent brilliance is obtained.

The other pigments specified in the Examples give inks having similar properties and the colors indicated.

EXAMPLE 3: in plastics

Transparent flexible-PVC colorations having excellent fastness to light are obtained by incorporating 0.05 part of the dye of Example 3 into 100 parts of flexible PVC mixture (derived from 65 parts of PVC powder, e.g. $^{(R)}$Vinoflex 531, 35 parts of plasticizer, e.g., $^{(R)}$Palatinol AH, and 2 parts of stabilizer on heated mixing rolls.

Flexible PVC colorations having good binding power may be similarly prepared from 0.25 part of the above dye, 2.5 parts of titanium dioxide (e.g., RN 56) and 50 parts of the flexible PVC mixture described above.

The pigments specified in the other Examples give similar colorations.

EXAMPLE 816

211 parts of the dye obtained by coupling diazotized 1-aminoanthraquinone with 2-hydroxynaphthoic acid-(3) is heated while stirring for 4 hours at 100° to 110° together with 1300 parts of nitrobenzene, 90 parts of thionyl chloride and 5 parts of dimethylformamide. Excess thionyl chloride is removed under vacuum and the uniformly crystalline azo dye acyl chloride which precipitates on cooling is filtered off, washed with 300 parts of nitrobenzene and then with 1000 parts of cyclohexane, and dried at 80° under subatmospheric pressure to yield 195 parts of a red crystal powder.

Analysis: calcd: Cl 8.05%.
found: Cl 8.5%.

8.8 parts of the acid chloride thus obtained is added to 8.5 parts of the amine of the formula

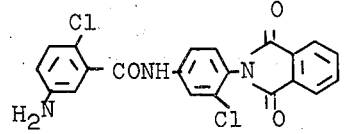

which has been dissolved in 200 parts of nitrobenzene and 20 parts of dimethylformamide. The whole is heated to 130° in the course of one hour, kept at this temperature for another 3 hours, allowed to cool to 100° and filtered. The residue is washed with nitrobenzene, dimethylformamide and then with methanol until the filtrate running away is clear. By drying at 60° under reduced pressure 12 parts of a bluish red pigment is obtained which is substantially insoluble in all common solvents. The pigment has the formula

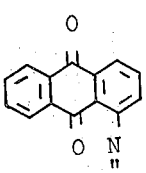

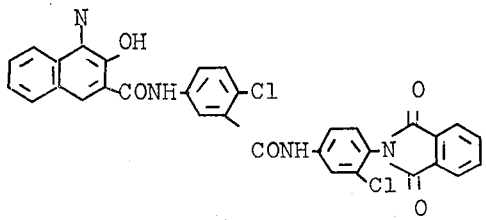

Analysis: calcd: Cl 8.4%.
found: Cl 8.4%.

EXAMPLE 817

140 parts of the dye obtained by coupling diazotized 3-amino-N-phenylphthalimide with 2-hydroxynaphthoic acid-(3) is heated in the course of an hour to 110° together with 400 parts of nitrobenzene, 60 parts of thionyl chloride and 5 parts of dimethylformamide and kept at this temperature for 3 hours. Excess thionyl chloride is removed under subatmospheric pressure and the uniformly crystalline azo dye acyl chloride which precipitates on cooling is filtered off, washed with 200 parts of nitrobenzene and then with 1000 parts of cyclohexane, and dried at 80° under subatmospheric pressure to yield 130 parts of a red powder.

Analysis: calcd: Cl 7.8%.
found: Cl 7.6%.

9.1 parts of the acid chloride thus obtained is stirred into a solution of 7.2 parts of the amine of the formula

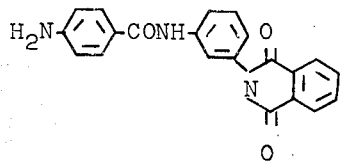

in 200 parts of nitrobenzene and 20 parts of dimethylformamide. The whole is heated to 130° in the course of an hour, kept at this temperature for another 3 hours, allowed to cool to 100° and filtered. The pigment is washed with nitrobenzene, dimethylformamide and methanol until the filtrate running away is clear. By drying at 60° under reduced pressure 13 parts of a yellowish red powder is obtained which is substantially insoluble in all common solvents. The pigment has the formula

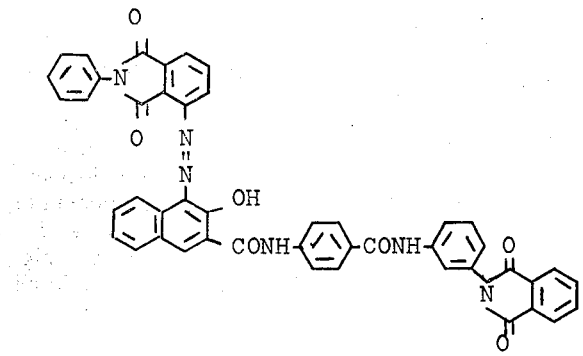

EXAMPLE 818

350 parts of the dye obtained by coupling diazotized 2,5-dichloroaniline with 2-hydroxynaphthoic acid-(3) is heated slowly (in the course of 2 hours) to 110° together with 1500 parts of nitrobenzene, 236 parts of thionyl chloride and 2 to 5 parts of dimethylformamide and kept at this temperature for 2 hours. Excess thionyl chloride is removed under subatmospheric pressure and the uniformly crystalline azo dye acyl chloride which precipitates on cooling is filtered off, washed with a little benzene and then with cyclohexane, and dried at 80° under subatmospheric pressure to yield 295 parts of a red crystal powder.

Analysis: calcd: Cl 28.35%.
found: Cl 29.9%.

7.6 parts of the acid chloride thus obtained is stirred into a solution of 7.4 parts of the amine of the formula

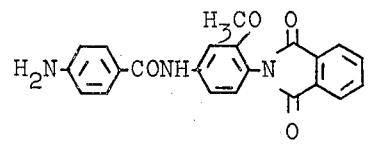

in 200 parts of nitrobenzene and 20 parts of dimethylformamide. The whole is heated to 130° in the course of an hour, kept at this temperature for another 3 hours, allowed to cool to 100° and filtered. The residue is washed with nitrobenzene, dimethylformamide and methanol until the filtrate running away is clear. By drying at 60° under reduced pressure 8.2 parts of a red pigment having good solvent fastness is obtained. The pigment has the formula

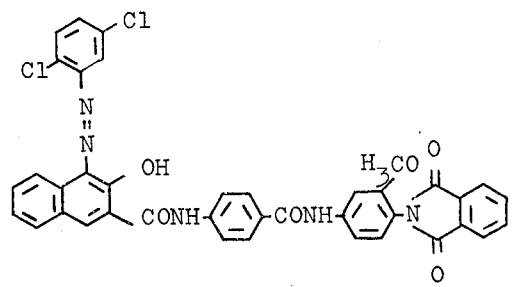

Analysis: calcd: Cl 9.9%.
found: Cl 9.9%.

EXAMPLE 819

237 parts of the dye obtained by coupling 2,4,5-trichloroaniline with 2-hydroxynaphthoic acid-(3) is heated in the course of 2 hours to 110° together with 500 parts of nitrobenzene, 142 parts of thionyl chloride and 2 parts of dimethylformamide and kept at this temperature for 2 hours. Excess thionyl chloride is removed under vacuum and the uniformly crystalline azo dye acyl chloride which precipitates on cooling is filtered off, washed with hot nitrobenzene and then with cyclohexane, and dried at 80° under subatmospheric pressure to yield 195 parts of deep red crystals.

Analysis: calcd: Cl 34.3%
found: Cl 34.4%.

8.3 parts of the acid chloride thus obtained is stirred into a solution of 7.8 parts of the amino of the formula

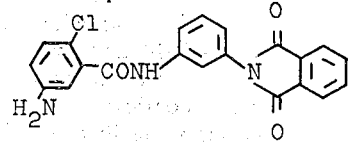

in 200 parts of o-dichlorobenzene and 80 parts of dimethylformamide. The whole is heated to 120° in the course of an hour, kept at this temperature for another 3 hours, allowed to cool to 100° and filtered. The residue is washed with o-dichlorobenzene, dimethylformamide and methanol until the filtrate running away is clear. By drying at 60° under reduced pressure 11.6 parts of a bluish red pigment is obtained which is substantially insoluble in all common solvents. The pigment has the formula

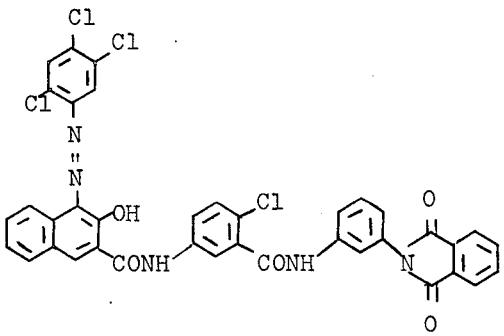

Analysis: calcd: Cl 18.2%.
found: Cl 18.3%.

Further azo pigments are obtained by following the method of Example 816 and using the diazo components D-NH$_2$ of formula IV specified in the following list and the amines of formula III. The last column gives the shade obtained by using the pigment for coloring surface coatings.

List of diazo components 1. 1-aminoanthraquinone
2. 3-amino-N-phenylphthalimide
3. 2.5-dichloroaniline
4. 2.4.5-trichloroaniline
5. 3.4-dichloroaniline
6. 2-chloroaniline
7. o-nitroaniline
8. 2-chloro-4-nitroaniline
9. 2-amino-5-nitrobenzonitrile
10. 2-methyl-4-nitroaniline
11. 2-methyl-5-nitroaniline
12. 2-nitro-4-methylaniline
13. 2-methoxy-4-nitroaniline
14. 3-amino-4-methoxybenzonitrile
15. 2-nitro-4-chloroaniline
16. 2-chloro-5-nitroaniline
17. 3-nitro-4-chloroaniline
18. 2-amino-5-chlorobenzonitrile
19. 2-methylsulfonyl-4-chloroaniline
20. methyl-2-aminobenzoate
21. dimethyl-2-aminoterephthalate
22. 3-amino-4-methylbenzonitrile
23. 3-amino-4-chlorobenzonitrile
24. 3-chloro-1-aminoanthraquinone
25. 2-aminoanthraquinone

| Ex. | Amine (formula III) | D-NH$_2$ diazo component | Color |
|---|---|---|---|
| 820 | ![structure] | 1 | red |
| 821 | '' | 2 | yellowish red |
| 822 | '' | 3 | orange |
| 823 | '' | 4 | yellowish red |
| 824 | ![structure] | 1 | reddish brown |
| 825 | '' | 2 | bluish red |
| 826 | '' | 3 | orange |
| 827 | '' | 4 | yellowish red |
| 828 | ![structure] | 1 | red |
| 829 | '' | 2 | orange |

| Ex. | Amine (formula III) | D-NH$_2$ diazo component | Color |
|---|---|---|---|
| 830 | [structure: phthalimide-N-C$_6$H$_4$-NHCO-C$_6$H$_3$(Cl)(Cl)-NH$_2$] | 3 | yellowish red |
| 831 | '' | 4 | bluish red |
| 832 | [structure: phthalimide-N-C$_6$H$_4$-NHCO-C$_6$H$_3$(CH$_3$)-NH$_2$] | 1 | red |
| 833 | '' | 2 | orange |
| 834 | '' | 3 | orange |
| 835 | '' | 4 | reddish brown |
| 836 | [structure: phthalimide-N-C$_6$H$_4$-NHCO-C$_6$H$_3$(OCH$_3$)-NH$_2$] | 1 | red |
| 837 | '' | 2 | orange |
| 838 | '' | 3 | red |
| 839 | '' | 4 | yellowish red |
| 840 | [structure: phthalimide-N-C$_6$H$_4$-NHCO-C$_6$H$_3$(Cl)-NH$_2$] | 1 | red |
| 841 | '' | 2 | orange |
| 842 | '' | 3 | orange |
| 843 | '' | 4 | orange |
| 844 | [structure: phthalimide-N-C$_6$H$_4$-NHCO-C$_6$H$_3$(Cl)-NH$_2$] | 1 | bluish red |
| 845 | '' | 2 | yellowish red |
| 846 | '' | 3 | red |
| 847 | '' | 4 | red |
| 848 | [structure: phthalimide-N-C$_6$H$_4$-NHCO-C$_6$H$_4$-NH$_2$] | 1 | red |
| 849 | '' | 2 | yellowish red |
| 850 | '' | 4 | orange |

-continued

| Ex. | Amine (formula III) | D-NH₂ diazo component | Color |
|---|---|---|---|
| 851 | [structure: phthalimide-N-C₆H₄-NHCO-C₆H₄-NH₂] | 4 | orange |
| 852 | [structure: OCH₃-substituted phthalimide-N-C₆H₄-NHCO-C₆H₄-NH₂] | 1 | red |
| 853 | " | 2 | orange |
| 854 | " | 4 | yellowish red |
| 855 | [structure: OCH₃-phthalimide-N-C₆H₄-NHCO-C₆H₃(Cl)-NH₂] | 1 | yellowish red |
| 856 | " | 2 | bluish red |
| 857 | " | 3 | yellowish red |
| 858 | " | 4 | yellowish red |
| 859 | [structure: OCH₃-phthalimide-N-C₆H₃(OCH₃)-NHCO-C₆H₃(CH₃)-NH₂] | 1 | red |
| 860 | [structure: OCH₃-phthalimide-N-C₆H₃-NHCO-C₆H₃(CH₃)-NH₂] | 2 | orange |
| 861 | " | 3 | orange |
| 862 | " | 4 | yellowish red |
| 863 | [structure: OCH₃-phthalimide-N-C₆H₃(OCH₃)-NHCO-C₆H₃(OCH₃)-NH₂] | 1 | red |
| 864 | " | 2 | yellowish red |
| 865 | " | 3 | orange |
| 866 | " | 4 | orange |
| 867 | [structure: OCH₃-phthalimide-N-C₆H₃-NHCO-C₆H₂(Cl)(Cl)-NH₂] | 1 | red |

-continued

| Ex. | Amine (formula III) | D-NH₂ diazo component | Color |
|---|---|---|---|
| 868 | " | 2 | red |
| 869 | " | 3 | orange |
| 870 | " | 4 | reddish brown |
| 871 | (structure: phthalimide-N-phenyl(OCH₃)-NHCO-phenyl(Cl)-NH₂) | 1 | bluish red |
| 872 | " | 2 | red |
| 873 | " | 3 | orange |
| 874 | " | 4 | orange |
| 875 | (structure: phthalimide-N-phenyl(OCH₃)-NHCO-phenyl(Cl)(NH₂)) | 1 | red |
| 876 | " | 2 | red |
| 877 | " | 3 | yellowish red |
| 878 | " | 4 | orange |
| 879 | (structure: phthalimide-N-phenyl(OCH₃)-NHCO-phenyl-NH₂) | 1 | red |
| 880 | " | 2 | red |
| 881 | " | 3 | yellowish red |
| 882 | (structure: phthalimide-N-phenyl(OCH₃)-NHCO-phenyl-NH₂) | 4 | orange |
| 883 | (structure: phthalimide-N-phenyl(Cl)-NHCO-phenyl-NH₂) | 1 | bluish red |
| 884 | " | 2 | red |
| 885 | " | 3 | red |
| 886 | " | 4 | red |
| 887 | (structure: phthalimide-N-phenyl(CH₃)-NHCO-phenyl(Cl)-NH₂) | 2 | yellowish red |

-continued

| Ex. | Amine (formula III) | D-NH₂ diazo component | Color |
|---|---|---|---|
| 888 | " | 3 | red |
| 889 | " | 4 | red |
| 890 | [structure: phthalimide with Cl, NHCO-phenyl-CH₃, NH₂] | 1 | orange |
| 891 | " | 2 | orange |
| 892 | " | 3 | yellowish red |
| 893 | [structure: phthalimide with Cl, NHCO-phenyl-CH₃, NH₂] | 4 | orange |
| 894 | [structure: phthalimide with Cl, NHCO-phenyl-NH₂] | 1 | red |
| 895 | " | 2 | red |
| 896 | " | 3 | orange |
| 897 | " | 4 | red |
| 898 | [structure: phthalimide with Cl, NHCO-phenyl-Cl,Cl, NH₂] | 1 | bluish red |
| 899 | " | 2 | red |
| 900 | " | 3 | red |
| 901 | " | 4 | bluish red |
| 902 | [structure: phthalimide with Cl, NHCO-phenyl-Cl, NH₂] | 1 | bluish red |
| 903 | [structure: phthalimide with Cl, NHCO-phenyl-Cl, NH₂] | 2 | yellowish red |
| 904 | " | 3 | red |
| 905 | " | 4 | red |

-continued

| Ex. | Amine (formula III) | D-NH₂ diazo component | Color |
|---|---|---|---|
| 906 | [structure: phthalimide-N-(2-Cl-phenyl)-NHCO-(2-Cl-4-NH₂-phenyl)] | 1 | bluish red |
| 907 | '' | 2 | red |
| 908 | '' | 3 | red |
| 909 | '' | 4 | red |
| 910 | [structure: phthalimide-N-(2-Cl-phenyl)-NHCO-(3-NH₂-phenyl)] | 1 | bluish red |
| 911 | '' | 2 | red |
| 912 | '' | 3 | red |
| 913 | '' | 4 | red |
| 914 | [structure: phthalimide-N-(3-phenyl)-NHCO-(4-NH₂-phenyl)] | 1 | red |
| 915 | '' | 3 | yellowish red |
| 916 | '' | 4 | bluish red |
| 917 | [structure: phthalimide-N-(3-phenyl)-NHCO-(4-CH₃-phenyl)] | 1 | red |
| 918 | '' | 2 | red |
| 919 | '' | 3 | yellowish red |
| 920 | '' | 4 | red |
| 921 | [structure: phthalimide-N-(3-phenyl)-NHCO-(2-Cl-5-NH₂-phenyl)] | 1 | red |
| 922 | '' | 2 | bluish red |
| 923 | '' | 3 | red |
| 924 | [structure: phthalimide-N-(3-phenyl)-NHCO-(2-OCH₃-5-NH₂-phenyl)] | 1 | bluish red |
| 925 | '' | 2 | red |
| 926 | '' | 3 | orange |
| 927 | '' | 4 | orange |

-continued

| Ex. | Amine (formula III) | D-NH₂ diazo component | Color |
|---|---|---|---|
| 928 | [structure: phthalimide-N-phenyl-NHCO-(2,6-dichloro-4-amino)phenyl] | 1 | bluish red |
| 929 | " | 2 | bluish red |
| 930 | " | 3 | red |
| 931 | " | 4 | red |
| 932 | [structure: phthalimide(acetyl)-N-phenyl-NHCO-(4-chloro-3-amino)phenyl] | 1 | red |
| 933 | " | 2 | orange |
| 934 | " | 3 | orange |
| 935 | " | 4 | orange |
| 936 | [structure: phthalimide-N-phenyl-NHCO-(2-chloro-4-amino)phenyl] | 1 | bluish red |
| 937 | " | 2 | red |
| 938 | " | 3 | red |
| 939 | " | 4 | red |
| 940 | [structure: phthalimide-N-phenyl-NHCO-(3-amino)phenyl] | 1 | reddish violet |
| 941 | " | 2 | bluish red |
| 942 | " | 3 | bluish red |
| 943 | " | 4 | bluish red |
| 944 | [structure: 5-chlorophthalimide-N-phenyl-NHCO-(2-chloro-5-amino)phenyl] | 2 | bluish red |
| 945 | [structure: 5-chlorophthalimide-N-phenyl-NHCO-(4-amino)phenyl] | 3 | orange |
| 946 | [structure: 5-chlorophthalimide-N-(2-methoxy)phenyl-NHCO-(2-chloro-5-amino)phenyl] | 4 | yellowish red |

| Ex. | Amine (formula III) | D-NH₂ diazo component | Color |
|---|---|---|---|
| 947 | (structure) | 1 | red |
| 948 | (structure) | 3 | red |
| 949 | (structure) | 2 | bluish red |
| 950 | (structure) | 1 | red |
| 951 | (structure) | 4 | yellowish red |
| 952 | (structure) | 1 | red |
| 953 | (structure) | 8 | bluish red |
| 954 | (structure) | 9 | red |

| Ex. | Amine (formula III) | D-NH₂ diazo component | Color |
|---|---|---|---|
| 955 | | 10 | red |
| 956 | | 12 | red |
| 957 | | 19 | yellowish red |
| 958 | | 20 | yellowish red |
| 959 | | 22 | bluish red |
| 960 | | 23 | red |
| 961 | | 25 | red |
| 962 | | 1 | red |
| 963 | | 1 | red |

| Ex. | Amine (formula III) | D-NH₂ diazo component | Color |
|---|---|---|---|
| 964 | (phthalimide-N-phenyl with NHCO-aryl, CH₃, NH₂ substituents) | 2 | yellowish red |
| 965 | (phthalimide-N-phenyl with NHCO-aryl, OCH₃, NH₂ substituents) | 4 | reddish brown |
| 966 | H₂N—⟨phenyl⟩—NHCO—⟨phenyl-N-phthalimide⟩ | 1 | bluish red |
| 967 | " | 4 | red |
| 968 | " | red | |
| 969 | H₂N—⟨phenyl with OCH₃⟩—NHCO—⟨phenyl-N-phthalimide⟩ | 1 | bluish red |
| 970 | " | 4 | red |
| 971 | H₂N—⟨phenyl with CH₃⟩—NHCO—⟨phenyl-N-phthalimide⟩ | 1 | yellowish red |

| Ex. | Amine (formula III) | D-NH$_2$ diazo component | Color |
|---|---|---|---|
| 972 | 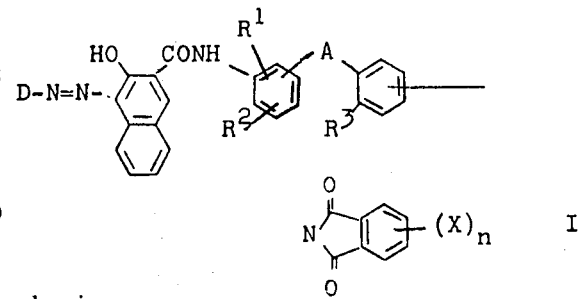 | 1 | bluish red |
| 973 | " | 4 | red |
| 974 | " | 5 | red |

APPLICATION

EXAMPLE 4: in surface coatings 5 parts of the dye of Example 816 and 95 parts of a coating composition of the baking type (e.g. 70% coconut alkyd resin (60% in xylene) and 30% melamine resin (approx. 55% in butanol/xylene)) are treated in an attritor mill. After application and approx. 30 minutes baking at 120° bright full-color coatings having very good fastness to light and overcoating are obtained. Reduction with e.g., titanium dioxide gives bright shades. Similar coatings may be produced by using the other pigments specified in the Examples.

EXAMPLE 5: in printing inks 5 parts of the dye of Example 817, 30 to 40 parts of resin (e.g., rosin modified with phenolformaldehyde) and 55 to 65 parts of toluene are intimately mixed in a dispersing unit. A toluene intaglio printing ink having outstanding fastness to light and excellent brilliance is obtained.

The other pigments specified in the Examples give inks having similar properties and the colors indicated.

EXAMPLE 6: in plastics

Transparent flexible-PVC colorations having excellent fastness to light are obtained by incorporating 0.05 part of the dye of Example 818 into 100 parts of flexible PVC mixture (derived from 65 parts of PVC powder, 35 parts of plasticizer and 2 parts of stabilizer on heated mixing rolls.

Flexible PVC colorations having good hiding power may be similarly prepared from 0.25 part of the above dye, 2.5 parts of titanium dioxide and 50 parts of flexible PVC mixture.

The pigments specified in the other Examples give similar results.

We claim:

1. An azo pigment of the formula wherein:

A is —NHCO— or —CONH—;

D is anthraquinonyl or chlorine-substituted anthraquinonyl with the azo group in the 1- or 2-position; N-phenylphthalimide with the azo group in the 3- or 4-position of the phenyl ring; or phenyl substituted by chlorine, bromine, methyl, methoxy, nitro, cyano, methylsulfonyl or carbomethoxy;

$R^1$ is hydrogen, chlorine, bromine, methyl, ethyl, methoxy, ethoxy, methylsulfonyl, ethylsulfonyl or cyano;

$R^2$ is hydrogen, chlorine, bromine, methyl, ethyl, methoxy or ethoxy;

$R^3$ is hydrogen, chlorine, methyl, ethyl, methoxy or ethoxy;

X is chlorine or bromine; and n is one of the integers 0, 1, 2, 3 and 4.

2. An azo pigment as claimed in claim 1 wherein $R^3$ is hydrogen or chlorine and X is chlorine.

3. An azo pigment as claimed in claim 1 wherein $R^2$ is hydrogen or chlorine.

* * * * *